US011967308B2

(12) United States Patent
Lee et al.

(10) Patent No.: US 11,967,308 B2
(45) Date of Patent: Apr. 23, 2024

(54) LANGUAGE MODEL AND ELECTRONIC DEVICE INCLUDING THE SAME

(71) Applicant: SAMSUNG ELECTRONICS CO., LTD., Suwon-si (KR)

(72) Inventors: Taewoo Lee, Suwon-si (KR); Taegyoon Kang, Suwon-si (KR); Hogyeong Kim, Suwon-si (KR); Minjoong Lee, Suwon-si (KR); Seokyeong Jung, Suwon-si (KR); Jiseung Jeong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 384 days.

(21) Appl. No.: 17/425,211

(22) PCT Filed: Jul. 8, 2021

(86) PCT No.: PCT/KR2021/008718
§ 371 (c)(1),
(2) Date: Jul. 22, 2021

(87) PCT Pub. No.: WO2022/019538
PCT Pub. Date: Jan. 27, 2022

(65) Prior Publication Data
US 2022/0319500 A1    Oct. 6, 2022

(30) Foreign Application Priority Data
Jul. 22, 2020  (KR) ..................... 10-2020-0090924

(51) Int. Cl.
*G10L 15/16*   (2006.01)
*G10L 15/06*   (2013.01)
*G10L 15/18*   (2013.01)

(52) U.S. Cl.
CPC .......... *G10L 15/16* (2013.01); *G10L 15/063* (2013.01); *G10L 15/18* (2013.01)

(58) Field of Classification Search
CPC ....... G10L 15/16; G10L 15/063; G10L 15/06; G10L 15/18; G10L 15/183; G06F 9/22;
(Continued)

(56) References Cited

U.S. PATENT DOCUMENTS 9,842,585 B2   12/2017  Huang et al.
10,235,994 B2   3/2019  Huang et al.
(Continued)

OTHER PUBLICATIONS

International Search Report and Written Opinion dated Oct. 28, 2021 in corresponding International Application No. PCT/KR2021/008718.
(Continued)

*Primary Examiner* — Huyen X Vo
(74) *Attorney, Agent, or Firm* — Nixon & Vanderhye P.C.

(57) ABSTRACT

Disclosed is an electronic device including processor and memory operatively connected to the processor and storing language model. The electronic device may enter data into the language model, generate an embedding vector in the input embedding layer, add position information to the embedding vector in the positional encoding layer, branch the embedding vector based on domain information, normalize the branched embedding vectors, enter the normalized embedding vectors into the multi-head attention layer, enter output data of the multi-head attention layer into the first layer, normalize pieces of output data of the first layer, enter the normalized pieces of output data of the first layer into the feed-forward layer, enter output data of the feed-forward layer into the second layer and normalize pieces of output data of the second layer, and enter the normalized pieces of output data of the second layer into the linearization layer and the softmax layer to obtain result data. In
(Continued)

addition, various embodiments as understood from the specification may be also possible.

20 Claims, 11 Drawing Sheets

(58) Field of Classification Search
CPC .......... G06F 9/30; G06F 16/33; G06F 16/332; G06F 16/955; G06F 16/3329; G06F 9/3005; G06F 16/3343; G06F 16/3344; G06F 16/3347; G06N 3/04; G06N 3/08
See application file for complete search history.

(56) References Cited

U.S. PATENT DOCUMENTS

| | | |
|---|---|---|
| 2020/0073937 A1 | 3/2020 | Zhao et al. |
| 2020/0125820 A1 | 4/2020 | Kim et al. |
| 2020/0342316 A1* | 10/2020 | Shazeer ................. G06N 3/044 |
| 2021/0144779 A1* | 5/2021 | Vahdat .................... G06N 3/08 |

OTHER PUBLICATIONS

Pfeiffer, Jonas et al., "AdapterFusion: Non-Destructive Task Composition for Transfer Learning", May 1, 2020.
Lynn-Evans, Samuel, "How to code the Transformer in Pytorch", Towards Data Science, Sep. 27, 2018, pp. 1-17.
Vaswani, Ashish et al., "Attention Is All You Need", Jun. 17, 2017.

* cited by examiner

LANGUAGE MODEL AND ELECTRONIC DEVICE INCLUDING THE SAME

CROSS-REFERENCE TO RELATED APPLICATIONS

This application is the U.S. national phase of International Application No. PCT/KR2021/008718 filed Jul. 8, 2021 which designated the U.S. and claims priority to Korean Application No. 10-2020-0090924 filed Jul. 22, 2020, the entire contents of each of which are hereby incorporated by reference.

TECHNICAL FIELD

The disclosure relates to a language model and an electronic device including the same.

Background Art

An artificial intelligence system may refer, for example, to a computer system implementing intelligence of a human level and may refer to a system that performs training and determination by itself and improves a recognition rate as the system is used.

An artificial intelligence technology may include a machine learning technology (e.g., deep learning) and element technologies. The machine learning technology may use an algorithm that classifies and/or trains features of pieces of input data by the artificial intelligence system. The element technologies may simulate functions of the human brain, for example, recognition, determination, and the like, using a machine learning algorithm.

For example, the element technologies may include a linguistic understanding technology that recognizes human language or text. The linguistic understanding technology may refer to a technology of recognizing, applying, and processing human language or text, and may include natural language processing, machine translation, dialogue systems, question and answer, speech recognition, and/or speech synthesis.

Various language models (LMs) are being developed to implement the linguistic understanding technology. The language model may include an artificial neural network. For the purpose of implementing a function of converting voice data into text information, the language model may be included in an electronic device together with a speech recognition model.

DISCLOSURE

Technical Problem

Conventionally, a full fine-tuning method has been used to train a language model. Because the above method updates an entire weight of the language model, there may be a forgetting issue of losing previously trained data.

Furthermore, a "build from scratch scheme" using an entire corpus including new data may be used to solve the forgetting issue. However, in this case, computational resources and training time may be consumed excessively. For example, as the number of required domains increases, the number of language models corresponding to a domain also needs to be increased. Accordingly, the resource and time may be consumed excessively.

Technical Solution

In accordance with an example embodiment of the disclosure, an electronic device may include: a processor and a memory operatively connected to the processor and storing at least one language model. The language model may include an input embedding layer, a positional encoding layer, at least one sub-network layer, a linearization layer, and a softmax layer. The at least one sub-network layer may include a multi-head attention layer, a first layer, a feed-forward layer, and a second layer. The memory may store one or more instructions that, when executed, cause the processor to: enter data into the language model, generate an embedding vector based on the data in the input embedding layer, add position information to the embedding vector in the positional encoding layer, branch the embedding vector based on domain information included in the embedding vector, normalize the branched embedding vectors, enter the normalized embedding vectors into the multi-head attention layer, enter output data of the multi-head attention layer into the first layer, normalize pieces of output data of the first layer, enter the normalized pieces of output data of the first layer into the feed-forward layer, enter output data of the feed-forward layer into the second layer and normalize pieces of output data of the second layer, and enter the normalized pieces of output data of the second layer into the linearization layer and the softmax layer to obtain result data.

In accordance with another example embodiment of the disclosure, a method of controlling an automatic speech recognition (ASR) model and a language model by an electronic device may include: entering data into the language model and generating an embedding vector based on the data in an input embedding layer, adding position information to the embedding vector in a positional encoding layer, branching the embedding vector based on domain information included in the embedding vector, normalizing the branched embedding vectors, entering the normalized embedding vectors into a multi-head attention layer, entering output data of the multi-head attention layer into a first layer and normalizing pieces of output data of the first layer, entering the normalized pieces of output data of the first layer into a feed-forward layer, entering output data of the feed-forward layer into a second layer and normalizing pieces of output data of the second layer, and entering the normalized pieces of output data of the second layer into a linearization layer and a softmax layer to obtain result data.

Advantageous Effects

According to various embodiments disclosed herein, a language model may be efficiently trained by branching a specified layer of a language model such that each data for a plurality of domains is capable of being processed.

According to various embodiments disclosed herein, it is possible to branch a specified layer having a relatively small weight. Accordingly, it is possible to minimize the number of weights to be increased depending on the number of domains to be added.

The language model according to an architecture disclosed herein may include an adapter module arranged in at least part of inner layers. It is possible to reduce a word error rate (WER) by including the adapter module in the language model.

Besides, a variety of effects directly or indirectly understood through the disclosure may be provided.

DESCRIPTION OF DRAWINGS

With regard to the description of the drawings, identical or similar reference numerals may be used to refer to identical or similar components.

MODE FOR INVENTION

Hereinafter, various example embodiments of the disclosure will be described in greater detail with reference to the accompanying drawings. However, it should be understood that the disclosure is not limited to specific embodiments, but rather includes various modifications, equivalents and/or alternatives of the embodiments of the present disclosure.

Figure 1:
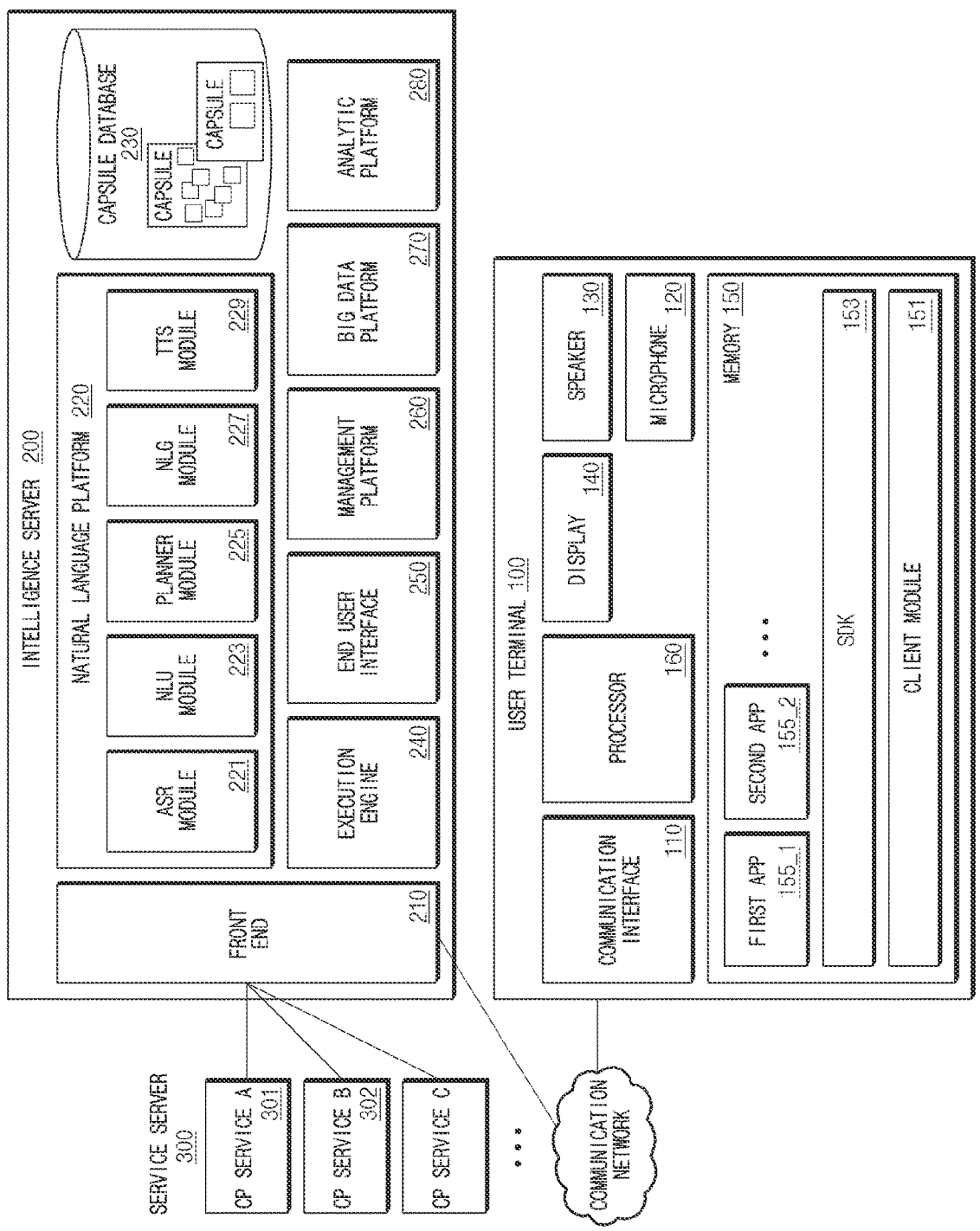
FIG. 1 is a block diagram illustrating an example integrated intelligence system according to various embodiments.

FIG. 1 is a block diagram illustrating an example integrated intelligence system according to various embodiments.

Referring to FIG. 1, an integrated intelligence system according to an embodiment of the present disclosure may include a user terminal 100, an intelligence server 200, and a service server 300.

The user terminal 100 of an embodiment of the present disclosure may be a terminal device (or an electronic device) connectable to the Internet, such as a mobile phone, a smartphone, a personal digital assistant (PDA), a laptop computer, a TV, white goods, a wearable device, an HMD, or a smart speaker.

According to the illustrated embodiment, the user terminal 100 may include a communication interface 110, a microphone 120, a speaker 130, a display 140, a memory 150, or a processor 160. The above elements may be operatively or electrically connected to each other. According to an embodiment of the present disclosure, the user terminal 100 may further include a camera. The camera may obtain image data related to a surrounding object.

The communication interface 110 of an embodiment of the present disclosure may be connected to an external device to transmit/receive data. The microphone 120 of an embodiment of the present disclosure may receive a sound (e.g., a user speech) and may convert the sound into an electric signal. The speaker 130 of an embodiment of the present disclosure may output an electric signal as a sound (e.g., a voice). The display 140 of an embodiment of the present disclosure may be configured to display an image or video. The display 140 of an embodiment of the present disclosure may also display a graphic user interface (GUI) of an executed application (or an application program).

The memory 150 of an embodiment of the present disclosure may store a client module 151, a software development kit (SDK) 153, and a plurality of applications 155. The client module 151 and the SDK 153 may include a framework (or a solution program) for executing a general-purpose function. Furthermore, the client module 151 or the SDK 153 may include a framework for processing a voice input.

The plurality of applications 155 may be programs for executing a designated function. According to an embodiment of the present disclosure, the plurality of applications 155 may include a first application 155_1 and a second application 155_3. According to an embodiment of the present disclosure, each of the plurality of applications 155 may include a plurality of operations for executing a designated function. For example, the applications may include an alarm application, a message application, and/or a schedule application. According to an embodiment of the present disclosure, the plurality of applications 155 may be executed by the processor 160 to sequentially perform at least a portion of the plurality of operations.

The processor 160 of an embodiment of the present disclosure may control overall operation of the user terminal 100. For example, the processor 160 may be electrically connected to the communication interface 110, the microphone 120, the speaker 130, and the display 140 to perform a designated operation.

The processor 160 of an embodiment of the present disclosure may execute the programs stored in the memory 150 to execute a designated function. For example, the processor 160 may execute at least one of the client module 151 or the SDK 153 to perform the following operations for processing a voice input. The processor 160 may control operation of the plurality of applications 155 through, for example, the SDK 153. The following operations described as operations of the client module 151 or the SDK 153 may be performed by the processor 160.

The client module 151 of an embodiment of the present disclosure may receive a voice input. For example, the client module 151 may receive a voice input corresponding to a user speech detected through the microphone 120. The client module 151 may transmit the received voice input to the intelligence server 200. The client module 151 may transmit, to the intelligence server 200, state information about the user terminal 100 together with the received voice input. The state information may be, for example, execution state information about an application.

The client module 151 of an embodiment of the present disclosure may receive a result corresponding to the received voice input. For example, the client module 151 may receive the result corresponding to the received voice input when the intelligence server 200 is capable of calculating the result corresponding to the received voice input. The client module 151 may display the received result on the display 140.

The client module 151 of an embodiment of the present disclosure may receive a plan corresponding to the received voice input. The client module 151 may display, on the display 140, results of performing a plurality of operations of an application according to the plan. The client module 151, for example, may sequentially display the results of performing a plurality of operations on the display 140. For another example, the user terminal 100 may display, on the display 140, only a portion of the results (e.g., result of performing a last operation) of performing a plurality of operations.

According to an embodiment of the present disclosure, the client module 151 may receive, from the intelligence server 200, a request for obtaining information required for calculating a result corresponding to a voice input. According to an embodiment of the present disclosure, the client module 151 may transmit the required information to the intelligence server 200 in response to the request.

The client module 151 of an embodiment of the present disclosure may transmit, to the intelligence server 200, result information about results of performing a plurality of operations according to the plan. The intelligence server 200 may confirm that the received voice input has been correctly performed, using the result information.

The client module 151 of an embodiment of the present disclosure may include a voice recognition module. According to an embodiment of the present disclosure, the client module 151 may recognize, through the voice recognition module, a voice input for executing a limited function. For example, the client module 151 may execute an intelligent application for processing a voice input for performing a systematic operation through a designated input (e.g., Wake up!).

The intelligence server 200 of an embodiment of the present disclosure may receive information related to a user voice input from the user terminal 100 via a communication network. According to an embodiment of the present disclosure, the intelligence server 200 may change data related to a received voice input into text data. According to an embodiment of the present disclosure, the intelligence server 200 may generate, based on the text data, a plan for performing a task corresponding to the user voice input.

According to an embodiment of the present disclosure, the plan may be generated by an artificial intelligence (AI) system. The artificial intelligence system may be a rule-based system or a neural network-based system (e.g., a feedforward neural network (FNN), a recurrent neural network (RNN)). Alternatively, the artificial intelligence system may be a combination of the foregoing systems or other artificial intelligence systems. According to an embodiment of the present disclosure, the plan may be selected from a set of predefined plans or may be generated in real time in response to a user request. For example, the artificial intelligence system may select at least one plan from among a plurality of predefined plans.

The intelligence server 200 of an embodiment of the present disclosure may transmit a result according to a generated plan to the user terminal 100, or may transmit the generated plan to the user terminal 100. According to an embodiment of the present disclosure, the user terminal 100 may display, on the display 140, a result according to a plan. According to an embodiment of the present disclosure, the user terminal 100 may display, on the display 140, a result of performing an operation according to a plan.

The intelligence server 200 of an embodiment of the present disclosure may include a front end 210, a natural language platform 220, a capsule database 230, an execution engine 240, an end user interface 250, a management platform 260, a big data platform 270, or an analytic platform 280.

The front end 210 of an embodiment of the present disclosure may receive a voice input received from the user terminal 100. The front end 210 may transmit a response corresponding to the voice input.

According to an embodiment of the present disclosure, the natural language platform 220 may include an automatic speech recognition (ASR) module 221, a natural language understanding (NLU) module 223, a planner module 225, a natural language generator (NLG) module 227, or a text-to-speech (TTS) module 229.

The automatic speech recognition module 221 of an embodiment of the present disclosure may convert a voice input received from the user terminal 100 into text data. The natural language understanding module 223 of an embodiment of the present disclosure may recognize an intention of a user using the text data of the voice input. For example, the natural language understanding module 223 may recognize the intention of the user by performing syntactic analysis or semantic analysis. The natural language understanding module 223 of an embodiment of the present disclosure may recognize a meaning of a word extracted from a voice input using a linguistic feature (e.g., syntactic element) of a morpheme or phrase, and may match the recognized meaning to an intention to determine the intention of the user.

The planner module 225 of an embodiment of the present disclosure may generate a plan using the intention and parameter determined by the natural language understanding module 223. According to an embodiment of the present disclosure, the planner module 225 may determine a plurality of domains required for performing a task, based on the determined intention. The planner module 225 may determine a plurality of operations included in each of the plurality of domains determined based on the intention. According to an embodiment of the present disclosure, the planner module 225 may determine parameters required for performing the plurality of determined operations or result values output by performing the plurality of operations. The parameters and the result values may refer, for example, to a concept of a designated form (or class). Accordingly, the plan may include a plurality of operations and a plurality of concepts determined according to the intention of the user. The planner module 225 may determine relationships between the plurality of operations and the plurality of concepts in stages (or hierarchically). For example, the planner module 225 may determine, based on the plurality of concepts, an execution order of the plurality of operations determined based on the intention of the user. In other words, the planner module 225 may determine the execution order of the plurality of operations based on the parameters required for performing the plurality of operations and results output by performing the plurality of operations. Accordingly, the planner module 225 may generate a plan including association information (e.g., ontology) between the plurality of operations and the plurality of concepts. The planner module 225 may generate a plan using information stored in the capsule database 230, which stores a set of relationships between concepts and operations.

The natural language generator module 227 of an embodiment of the present disclosure may change designated information into a text form. The information changed into a text form may have a form of a natural language utterance. The text-to-speech module 229 of an embodiment of the present disclosure may change text-form information into voice-form information.

According to an embodiment of the present disclosure, a portion or all of functions of the natural language platform 220 may be implementable in the user terminal 100.

The capsule database 230 may store information about relationships between a plurality of operations and concepts corresponding to a plurality of domains. According to an embodiment of the present disclosure, a capsule may include a plurality of action objects (or action information) and concept objects (or concept information). According to an embodiment of the present disclosure, the capsule database 230 may store a plurality of capsules in a form of a concept action network (CAN). According to an embodiment of the present disclosure, the plurality of capsules may be stored in a function registry included in the capsule database 230.

The capsule database 230 may include a strategy registry, which stores strategy information required when determining a plan corresponding to a voice input. The strategy information may include reference information for determining one plan when there are a plurality of plans corresponding to a voice input. According to an embodiment of the present disclosure, the capsule database 230 may include a follow-up registry, which stores follow-up operation information for suggesting a follow-up operation to the user in a designated situation. The follow-up operation may include, for example, a follow-up utterance. According to an embodiment of the present disclosure, the capsule database 230 may include a layout registry, which stores layout information about information output through the user terminal 100. According to an embodiment of the present disclosure, the capsule database 230 may include a vocabulary registry, which stores vocabulary information included in capsule information. According to an embodiment of the present disclosure, the capsule database 230 may include a dialog registry, which stores dialog information about a dialog (or interaction) with the user. The capsule database 230 may update a stored object through a developer tool. The developer tool may include, for example, a function editor for updating an action object or a concept object. The developer tool may include a vocabulary editor for updating a vocabulary. The developer tool may include a strategy editor for generating and registering a strategy for determining a plan. The developer tool may include a dialog editor for generating a dialog with the user. The developer tool may include a follow-up editor for editing a follow-up utterance that activates a follow-up objective and provides a hint. The follow-up objective may be determined based on a currently set objective, user's preference, or environmental condition. In an embodiment of the present disclosure, the capsule database 230 may also be implementable in the user terminal 100.

The execution engine 240 of an embodiment of the present disclosure may calculate a result using the generated plan. The end user interface 250 may transmit the calculated result to the user terminal 100. Accordingly, the user terminal 100 may receive the result and may provide the received result to the user. The management platform 260 of an embodiment of the present disclosure may manage information used in the intelligence server 200. The big data platform 270 of an embodiment of the present disclosure may collect data of the user. The analytic platform 280 of an embodiment of the present disclosure may manage quality of service (QoS) of the intelligence server 200. For example, the analytic platform 280 may manage elements and a processing speed (or efficiency) of the intelligence server 200.

The service server 300 of an embodiment of the present disclosure may provide a designated service (e.g., food order or hotel reservation) to the user terminal 100. According to an embodiment of the present disclosure, the service server 300 may be a server operated by a third party. The service server 300 of an embodiment of the present disclosure may provide, to the intelligence server 200, information for generating a plan corresponding to a received voice input. The provided information may be stored in the capsule database 230. Furthermore, the service server 300 may provide result information according to a plan to the intelligence server 200. The service server 300 may include a plurality of services (e.g. CP service A 301, CP service B 302, or CP service C)

In the above-described integrated intelligence system, the user terminal 100 may provide various intelligent services to the user in response to a user input. The user input may include, for example, an input via a physical button, a touch input, or a voice input.

In an embodiment of the present disclosure, the user terminal 100 may provide a voice recognition service through an intelligent application (or a voice recognition application) stored in the user terminal 100. In this case, for example, the user terminal 100 may recognize a user utterance or voice input received through the microphone, and may provide a service corresponding to a recognized voice input to the user.

In an embodiment of the present disclosure, the user terminal 100 may perform, based on a received voice input, a designated operation alone or in combination with the intelligence server and/or service server. For example, the user terminal 100 may execute an application corresponding to the received voice input, and may perform the designated operation through the executed application.

In an embodiment of the present disclosure, when the user terminal 100 provides a service in combination with the intelligence server 200 and/or the service server 300, the user terminal 100 may detect a user utterance using the microphone 120, and may generate a signal (or voice data) corresponding to the detected user utterance. The user terminal 100 may transmit the voice data to the intelligence server 200 using the communication interface 110.

The intelligence server 200 according to an embodiment of the present disclosure may generate, as a response to a voice input received from the user terminal 100, a plan for performing a task corresponding to the voice input or a result of performing an operation according to the plan. The plan may include, for example, a plurality of operations for performing a task corresponding to a user voice input and a plurality of concepts related to the plurality of operations. The concepts may be definitions of parameters input for performing the plurality of operations or result values output by performing the plurality of operations. The plan may include association information between the plurality of operations and the plurality of concepts.

The user terminal 100 of an embodiment of the present disclosure may receive the response using the communication interface 110. The user terminal 100 may output a voice signal generated in the user terminal 100 to the outside using the speaker 130, or may output an image generated in the user terminal 100 to the outside using the display 140.

Figure 2:
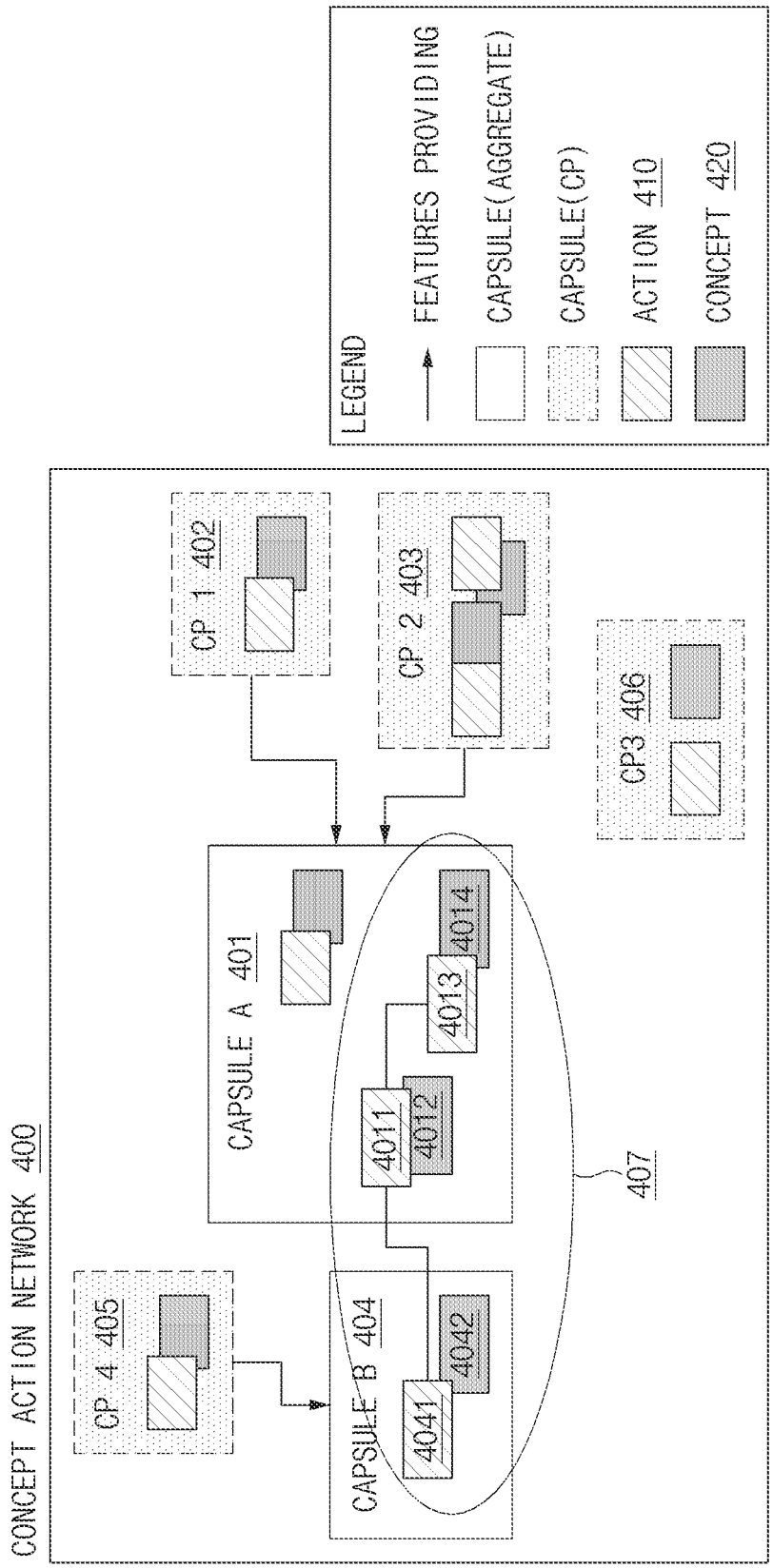
FIG. 2 is a diagram illustrating an example in which relationship information between a concept and an action is stored in a database according to various embodiments.

FIG. 2 is a diagram illustrating an example in which relationship information between a concept and an operation is stored in a database according to various embodiments.

The capsule database (e.g., capsule database 230) of the intelligence server 200 may store capsules in a form of a CAN. The capsule database may store an operation for performing a task corresponding to a user voice input and a parameter required for the operation in a form of a CAN.

The capsule database may store a plurality of capsules A 401 and B 404 corresponding to a plurality of domains (e.g., applications) respectively. According to an embodiment of the present disclosure, a single capsule (e.g., capsule A 401) may correspond to a single domain (e.g., location (geo), application). Furthermore, at least one service provider (e.g., CP 1 402 or CP 2 403) for executing a function for a domain related to one capsule may correspond to the one capsule. According to an embodiment of the present disclosure, a single capsule may include at least one operation 410 and at least one concept 420 for executing a designated function.

The natural language platform 220 may generate a plan for performing a task corresponding to a received voice input using a capsule included in the capsule database. For example, the planner module 225 of the natural language platform 220 may generate a plan using a capsule stored in the capsule database. For example, the planner module 225 may generate a plan 407 using operations 4011 and 4013 and concepts 4012 and 4014 of the capsule A 410 and an operation 4041 and concept 4042 of the capsule B 404.

Figure 3:
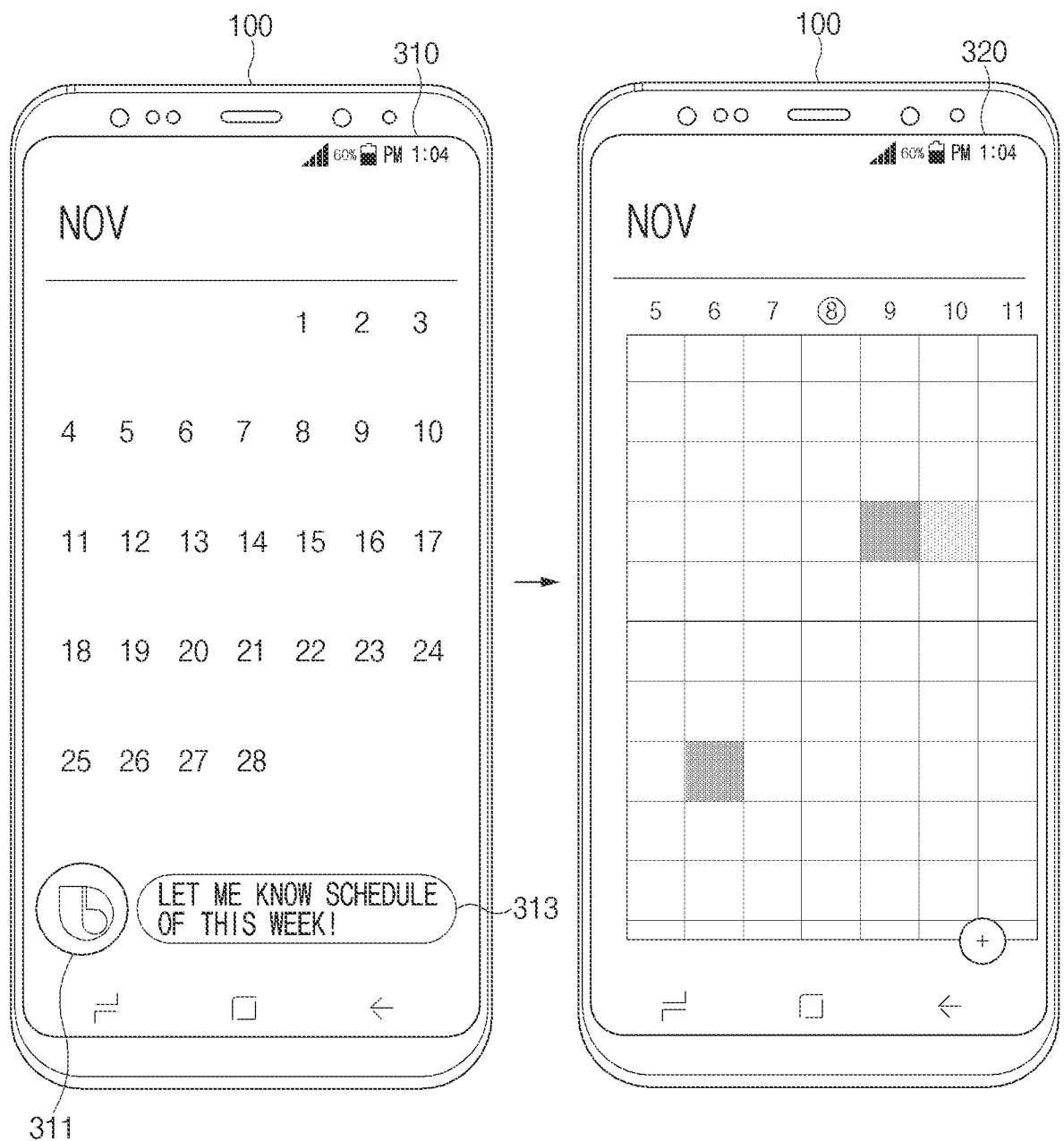
FIG. 3 is a diagram illustrating a user terminal which displays a screen in which a received voice input is processed through an intelligent application according to various embodiments.

FIG. 3 is a diagram illustrating an example screen in which a voice input received through an intelligent application is processed by a user terminal according to various embodiments.

The user terminal 100 may execute an intelligent application for processing a user input through the intelligence server 200.

According to an embodiment of the present disclosure, in a screen 310, when the user terminal 100 has recognized a designated voice input (e.g., Wake up!) or has received an input via a hardware key (e.g., dedicated hardware key), the user terminal 100 may execute an intelligent application for processing a voice input. The user terminal 100, for example, may execute an intelligent application in a state in which a schedule application has been executed. According to an embodiment of the present disclosure, the user terminal 100 may display, on the display 140, an object (e.g., icon) 311 corresponding to an intelligent application. According to an embodiment of the present disclosure, the user terminal 100 may receive a voice input caused by a user utterance. For example, the user terminal 100 may receive a voice input "Tell me the schedule of this week!". According to an embodiment of the present disclosure, the user terminal 100 may display, on the display, a user interface (UI) 313 (e.g., input window) of an intelligent application on which text data of the received voice input is displayed.

According to an embodiment of the present disclosure, in a screen 320, the user terminal 100 may display, on the display, a result corresponding to the received voice input. For example, the user terminal 100 may receive a plan corresponding to a received user input, and may display "schedule of this week" on the display according to the plan.

Figure 4:
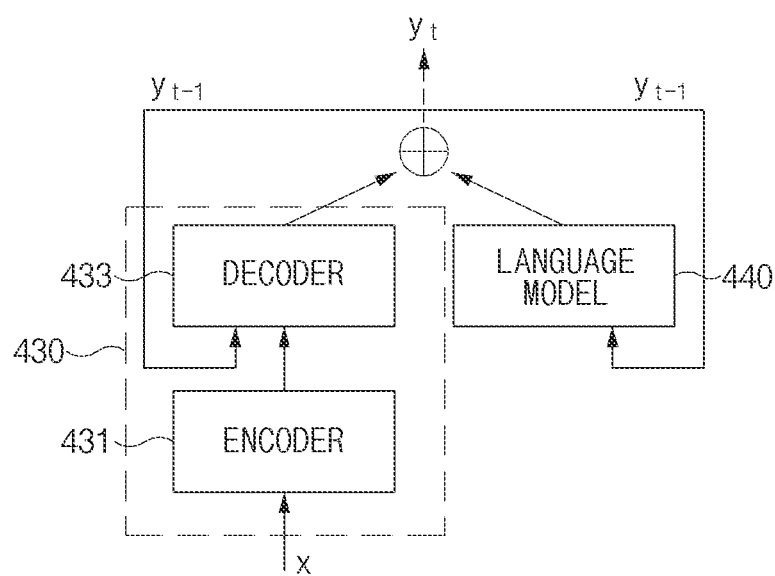
FIG. 4 is a block diagram illustrating an example speech recognition module including an ASR model and a language model, according to various embodiments.

FIG. 4 is a block diagram illustrating an example speech recognition module (e.g., the ASR module 221 of FIG. 1) including an ASR model 430 and a language model 440, according to various embodiments.

According to an embodiment, an electronic device (e.g., the user terminal 100 or the intelligence server 200 in FIG. 1) may include the ASR model 430 and the language model 440. For example, the electronic device may store instructions to be executed by a processor (e.g., the processor 160 in FIG. 1), the ASR model 430, and/or the language model 440 in a memory (e.g., the memory 150 in FIG. 1).

According to an embodiment, the ASR model 430 and the language model 440 may be models based on neural network architecture. The neural network architecture may be implemented in various architectures such as, for example, and without limitation, a deep neural network (DNN) or a bidirectional long short term memory (BLSTM). The neural network may perform a recognition operation or a learning process through artificial nodes. In this case, various parameters (e.g., a weight of each layer) of the neural network may be stored in the memory 150 of the electronic device. The neural network may refer, for example, to a model that is implemented as hardware, software, or a combination of at least a piece of hardware and at least a piece of software, which performs computational and data processing functions using a plurality of artificial nodes. The neural network may include a plurality of layers. For example, the neural network may include an input layer, at least one hidden layer, and/or an output layer. Nodes included in the input layer, the hidden layer, and the output layer may be connected to one another through connection lines each of which has a weight. The input layer may receive input data and may deliver the input data to the hidden layer. The output layer may generate output data based on signals received from nodes of the hidden layer. The electronic device may convert the input data into a value, which is easily predicted, using at least one or more hidden layers connected between the input layer and the output layer. Each of the input layer, the hidden layer, and the output layer may include a plurality of nodes. The hidden layer may refer, for example, to a layer corresponding to a fully-connected layer or a convolution filter in a convolutional neural network (CNN), but is not limited thereto. For example, the hidden layer may refer, for example, to various types of filters or layers that are classified based on a specified function or feature.

According to an embodiment, the ASR model 430 may refer, for example, to a model designed to output text data based on a voice signal obtained from the outside (e.g., a user). For example, the ASR model 430 may be a model for recognizing a voice signal obtained from the outside in units of phonemes. For example, the ASR model 430 may include an encoder 431 and a decoder 433. The ASR model 430 may be operatively connected to the language model 440 to output text data. For example, the encoder 431 may include at least one embedding layer. The encoder 431 may convert the input data into an embedding vector using a learning model, which has already been trained, and may continuously update the learning model while training is performed. When the learning model is updated, the encoder 431 may output different embedding vectors for the same input data. For example, the decoder 433 may include a DNN implemented with a fully-connected layer. The DNN may include a feedforward layer or a linear layer. For another example, the decoder 433 may include an attention RNN implemented with a gated recurrent unit (GRU).

According to an embodiment, the language model 440 may refer to a model designed to obtain probability information based on a connection relationship between a plurality of words. The language model 440 may provide probability information about the next word to be connected to a word entered into the language model 440. In this case, the language model 440 may use a softmax layer to provide the probability information. For example, when a word of "this" is entered into the language model 440, the language model 440 may provide information about a probability that "is" or "was" is to be connected among words connected to "this". The electronic device may select the connection relationship between words having the highest probability based on the probability information generated using the ASR model 430 and the language model 440, and may output the selected result data as a result of voice recognition. For example, the language model 440 may be trained using a sequence-to-sequence (seq2seq) learning model. The seq2seq learning model may refer, for example, to a model that is implemented using at least one of an encoder-decoder architecture or an attention mechanism architecture based on a recurrent neural network (RNN). The encoder-decoder architecture may refer, for example, to an architecture that compresses an input sequence into a single vector having a fixed size through an encoder and outputs the single vector having a fixed size as an output sequence through a decoder.

The attention mechanism architecture may refer, for example, to an architecture including a mechanism that predicts an output word by referring to an input word portion associated with an output word to be predicted at the corresponding time step with relatively more attention upon referring to input data from the encoder at each time step in which the decoder predicts an output word.

According to an embodiment, a speech recognition module may generate a final voice recognition result (yt) for a voice signal (x) obtained from the outside (e.g., a user) using the ASR model 430 and the language model 440. For example, the ASR model 430 may generate candidates (e.g., output data of the decoder 433) of data to be output based on encoded result data (e.g., output data of the encoder 431) and a previously-determined recognition result (yt−1). The language model 440 may generate the candidates of data to be output based on the previously-determined recognition result. The electronic device may generate the final voice recognition result by calculating pieces of output data, which are derived from each model, depending on specified weights.

The ASR model 430 and the language model 440 are illustrated in FIG. 4 as being divided into separate components, but are not limited thereto. For example, the language model 440 may be designed to be included in the ASR model 430. Hereinafter, the architecture of the language model 440 will be described in detail.

Figure 5:
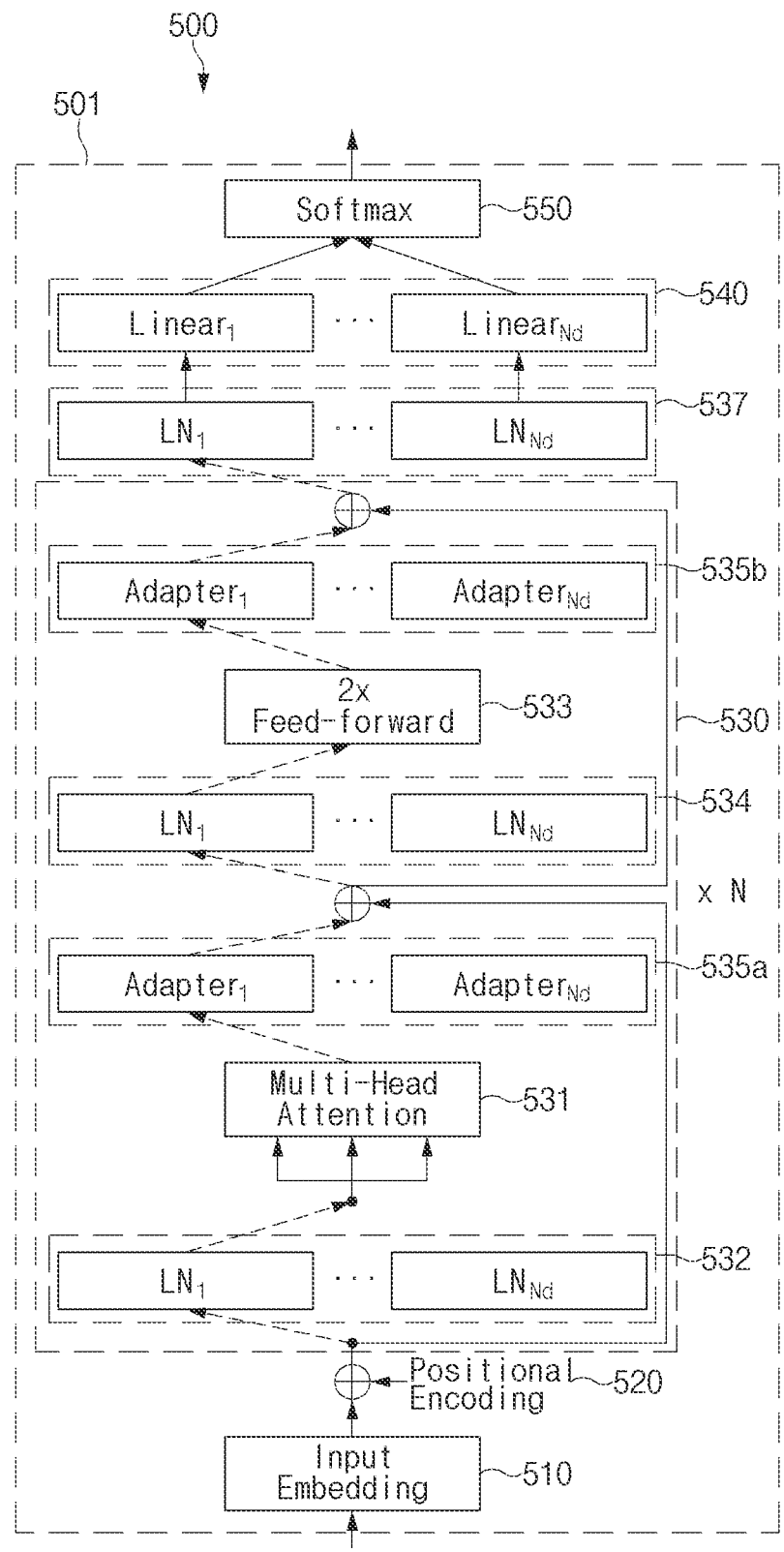
FIG. 5 is a diagram illustrating an example architecture of a language model included in an electronic device, according to various embodiments.

FIG. 5 is a diagram illustrating an example architecture 500 of a language model 501 included in an electronic device, according to various embodiments.

Referring to FIG. 5, the language model 501 (e.g., the language model 440 of FIG. 4) may be implemented by at least one hardware module, at least one software module, or various combinations thereof.

According to an embodiment, the language model 501 may include a neural network architecture including a plurality of layers. For example, the language model 501 may include an input embedding layer 510, a positional encoding layer 520, at least one sub-network layer 530, a linearization layer 540, and/or a softmax layer 550. The language model 501 may include at least one linear normalization layer (e.g., a first linear normalization layer 532, a second linear normalization layer 534, and a third linear normalization layer 537).

According to an embodiment, the input embedding layer 510 may generate an embedding vector by converting each word included in the input data into a vector. The input data entered into the input embedding layer 510 may include word-pieces that are segmented in advance. For example, the input data may be segmented into a plurality of word-pieces based on a word-piece algorithm or a sentence-piece algorithm in advance. The input embedding layer 510 may convert at least part of the segmented word-pieces into a vector having a hidden size. For example, the input embedding layer 510 may respectively convert words included in the input data into vectors and then may respectively generate embedding vectors corresponding to the vectors. A size of each vector may correspond to a size of each word. An operation of converting each word included in the input data into a vector may refer, for example, to word embedding.

The embedding vector output from the input embedding layer 510 may correspond to input data of the positional encoding layer 520. For example, the embedding operation performed by the input embedding layer 510 may be described by Equation 1 below.

$$W_e^o = x_t W_e \quad \text{[Equation 1]}$$

$x_t$ may be referred to as "input data" (e.g., one-hot vector). $W_e^o$ may be referred to as an output of an embedding vector (e.g., an output vector data matrix of the input embedding layer 510). $W_e$ may be referred to as a "weight matrix" in the input embedding layer 510. For example, when a vocabulary size corresponding to a size of a vector is $N_w$, and a hidden size of a neural network is h, Equation 2 may be established as follows.

$$W_e \in \mathbb{R}^{N_w \times h}$$

$$W_e^o \in \mathbb{R}^{1 \times h} \quad \text{[Equation 2]}$$

According to an embodiment, the positional encoding layer 520 may add position information to an embedding vector received from the input embedding layer 510. For example, the positional encoding layer 520 may enter position information by adding a positional encoding vector PE to the embedding vector (e.g., $W_e^o$). The positional encoding vector may satisfy a condition of $PE \in \mathbb{R}^{1 \times h}$. The positional encoding layer 520 may add information about a relative or absolute position to the embedding vector. An operation of adding the position information to the embedding vector may refer, for example, to positional encoding. For example, in a language model according to various embodiments of the disclosure, the input data may not be sequentially entered. Accordingly, the input data may include sequence information. The positional encoding layer 520 may add information about the relative or absolute position by summing or multiplying the embedding vector, which is output from the input embedding layer 510, by a vector having the same size as the embedding vector.

According to an embodiment, the at least one sub-network layer 530 may include a multi-head attention layer 531, a first layer 535a, a feed-forward layer 533, and/or a second layer 535b. The at least one sub-network layer 530 may receive an embedding vector, to which positional encoding is applied, from the positional encoding layer 520. The first linear normalization layer 532 may be included in an input terminal of the at least one sub-network layer 530. The embedding vector, to which positional encoding is applied in the positional encoding layer 520, may be branched and entered into the first linear normalization layer 532. Each embedding vector may be linearly normalized.

For example, the multi-head attention layer 531 may include at least one or more attention layers. Each of the at least one or more attention layers may include a weight matrix for different queries, different keys, or different values. The multi-head attention layer 531 may receive data (e.g., a query, a key, and/or a value), which is generated after the embedding vector, to which positional encoding is applied, is branched from the positional encoding layer 520, and then each of the branched embedding vectors is normalized. For example, the embedding vector may be branched based on domain information (e.g., a contact) included in the embedding vector. The attention layer may refer, for example, to a layer configured to obtain a similarity between a key and a query of the input data. The attention layer may set the similarity between a query and a key to a weight, may reflect the similarity to a value mapped into each key, may perform a weighted sum on all values, to each of which the similarity is reflected, and may generate final output data. For example, an input/output operation of data performed in the multi-head attention layer 531 having $N_{head}$ heads (or attention functions) may be described by Equation 3 below.

$$MultiHead(Q, K, V) = Concat(head_1, \ldots, head_{N_{head}})W^O \quad \text{[Equation 3]}$$

where $$head_i = \text{Attention}(QW_i^Q, KW_i^K, VW_i^V)$$
$$= softmax\left(\frac{(QW_i^Q)(KW_i^K)^T}{\sqrt{\frac{h}{N_{head}}}}\right)(VW_i^V)$$

The multi-head attention layer 531 may concatenate output values of a plurality of attention functions. Afterward, a result value obtained by multiplying the weight matrix $W^O$ may be output. A head ($head_i$) may be referred to as a plurality of attention functions.

For example, the first layer 535a may include a plurality of first adapter modules. As illustrated in FIG. 5, the first layer 535a may include $N_d$ adapter modules. For example, $N_d$ may refer, for example, to the number of different domains included in the language model 501. $N_d$ may be referred to as an integer value greater than 0. The plurality of first adapter modules may correspond to different domains, respectively. For example, output data of the multi-head attention layer 531 may be branched and entered into at least one of the plurality of first adapter modules included in the first layer 535a. Data output from the first layer 535a may be normalized and entered into the feed-forward layer 533. The second linear normalization layer 534 may be included in an output terminal of the first layer 535a. Data output from the first layer 535a may be branched and entered into the second linear normalization layer 534. Each data may be linearly normalized.

For example, the feed-forward layer 533 may include at least one artificial neural network. For example, the feed-forward layer 533 may include a position-wise fully-connected feed-forward neural network (FFNN). The feed-forward layer 533 may include at least one linear transformation function and/or at least one activation function. For example, the feed-forward layer 533 may include at least one of a rectified linear unit (ReLu) function or a Gaussian error linear unit (GeLu) function. An input/output operation of data performed in the feed-forward layer 533 may be described by Equation 4 below.

$$FFN(i_1) = \max(0, i_1 W_1 + b_1) W_2 + b_2 \quad \text{[Equation 4]}$$

Assuming that input data of the feed-forward layer 533 is $i_1$, input data, weight matrices (e.g., $W_1$ and $W_2$), and bias vector (e.g., $b_2$) in Equation 4 may satisfy a condition of Equation 5 below.

$$i_1 \in \mathbb{R}^{1 \times h}, W_1 \in \mathbb{R}^{h \times f}, b_1 \in \mathbb{R}^{1 \times f}, W_2 \in \mathbb{R}^{f \times h}, \text{ and}$$
$$b_2 \in \mathbb{R}^{1 \times h} \quad \text{[Equation 5]}$$

The second layer 535b may be referred to as a layer having substantially the same architecture as the above-described first layer 535a. For example, the second layer 535b may include a plurality of second adapter modules. The plurality of second adapter modules may correspond to different domains, respectively. For example, output data of the feed-forward layer 533 may be branched and entered into at least one of the plurality of second adapter modules included in the second layer 535b. Data output from the second layer 535b may be branched and entered into the third linear normalization layer 537. For example, the data output from the second layer 535b may be branched and entered into the third linear normalization layer 537. Afterward, data normalized by the third linear normalization layer 537 may be entered into the linearization layer 540. Output data $A_1$ ($i_2$) in the first layer 535a and output data $A_2$ ($i_3$) in the second layer 535b may be described by Equation 6 below.

$$A_1(i_2) = i_2 + \max(0, i_2 W_3 + b_3) W_4 + b_4$$
$$A_2(i_3) = i_3 + \max(0, i_3 W_5 + b_5) W_6 + b_6 \quad \text{[Equation 6]}$$

In Equation 6, $i_2$ may denote output data of the multi-head attention layer 531, and $i_3$ may denote output data of the feed-forward layer 533. Assuming that a filter size of an adapter module included in the adapter layers (e.g., the first layer 535a and/or the second layer 535b) is $f_A$, weight matrix (e.g., $W_3$, $W_4$, $W_5$, $W_6$) and bias vectors (e.g., $b_3$, $b_4$, $b_5$, $b_6$) in Equation 6 may satisfy a condition of Equation 7 below.

$$W_3, W_5 \in \mathbb{R}^{h \times f_A}, b_3, b_5 \in \mathbb{R}^{1 \times f_A}, W_4, W_6 \in \mathbb{R}^{f_A \times h}, b_4,$$
$$b_6 \in \mathbb{R}^{1 \times h}. \quad \text{[Equation 7]}$$

For example, the linearization layer 540 may perform linear transformation on data output from the sub-network layer 530 such that the softmax layer 550 processes the data. For example, the linearization layer 540 may project a vector, which is output from the sub-network layer 530, into a vector (e.g., logits vector) having a different size. A linearization operation in the linearization layer 540 may be performed by the linearization projection matrix $W_7$. For example, the linearization projection matrix may be a matrix that satisfies a condition of $W_7 \in \mathbb{R}^{h \times N_w}$.

For example, the softmax layer 550 may convert data output from the linearization layer 540 into a probability value. For example, the softmax layer 550 may generate a probability distribution by applying a softmax function to the output data of the linearization layer 540. The electronic device may select at least one result using the probability distribution generated by the softmax layer 550.

According to an embodiment, at least part of layers included in the language model 501 may be skip-connected. The skip connection may refer, for example, to a connection structure in which data obtained by adding an input of a specified layer and an output of a specified layer is used as an input of the next layer. For example, a processor (e.g., the processor 160 in FIG. 1) may skip-connect an output terminal of the positional encoding layer 520 and an output terminal of the first layer 535a. In this way, the processor may sum pieces of skip-connected data and then may normalize the summed data. As another example, the processor may skip-connect the output terminal of the first layer 535a and an output terminal of the second layer 535b. In this way, the processor may sum pieces of skip-connected data and then may normalize the summed data.

According to an embodiment, the processor may finely tune the language model 501 only for a target domain (e.g., a target domain) by branching data entered into the first layer 535a, the second layer 535b, the linear normalization layer 537, and the linearization layer 540. For example, a ratio of weights of the first layer 535a, the second layer 535b, and the linearization layer 540 may occupy about 13% of the total weight of the language model 501. However, a numerical value of about 13% is an example, and embodiments of the disclosure are not limited thereto. The processor may add the weight of the target domain only to the first layer 535a, the second layer 535b, the linear normalization layer 537, and the linearization layer 540 without adding a weight of the entire architecture of the language model 501 according to the architectures of various embodiments proposed in this specification. Accordingly, the processor may finely tune the language model 501. Referring to FIG. 5, when the target domain is a first domain, the processor may add a weight of the first domain among Nd domains only to the first layer 535a, the second layer 535b, the linear normalization layer 537, and the linearization layer 540. Accordingly, the processor may finely tune the language model 501. Accordingly, the plurality of domains may be finely tuned with the single language model 501 by increasing only weights of some layers included in the language model 501.

In FIG. 5, a training operation of the language model 501 for the target domain is described. However, the embodiments of the disclosure are not limited thereto. For example, even when an inference function is performed, an operation of calculating or processing input data and output data that is performed in each layer of the language model 501 may be applied substantially identically or similarly.

Hereinafter, a description of the architecture of adapter modules included in the first layer 535a1 and the second layer 535b will be described in greater detail below with reference to FIG. 6.

Figure 6:
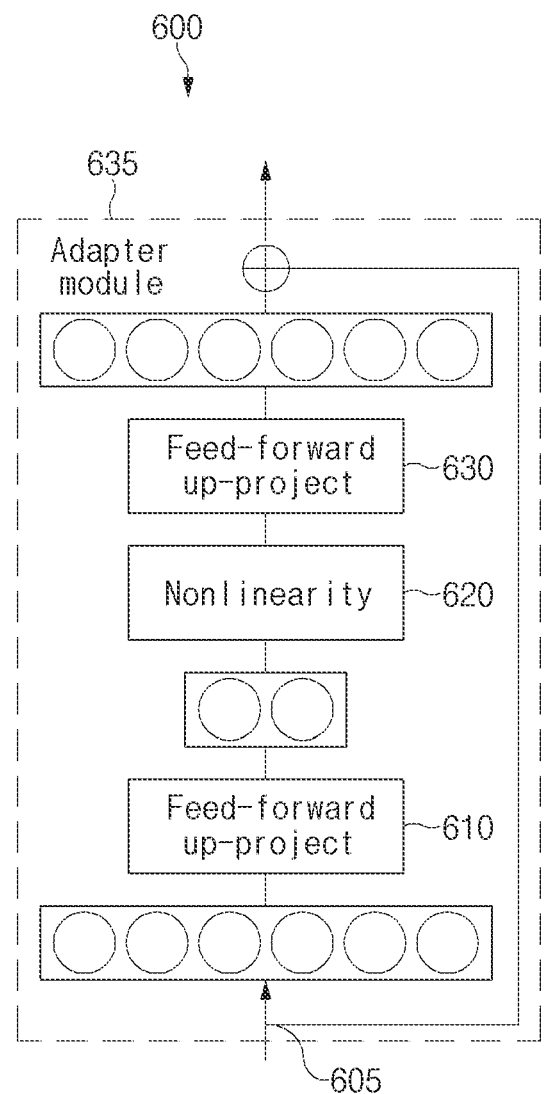
FIG. 6 is a diagram illustrating an example hierarchical architecture of an adapter module included in a language model, according to various embodiments.

FIG. 6 is a diagram illustrating an example hierarchical architecture 600 of an adapter module 635 included in a language model (e.g., the language model 501 of FIG. 5), according to various embodiments.

Referring to FIG. 6, the adapter module 635 may include a plurality of feed-forward neural networks (e.g., a first feed-forward neural network 610 and a second feed-forward neural network 630) and/or an activation function 620.

According to an embodiment, a dimension of input data 605 received by the adapter module 635 may be converted by a plurality of feed-forward neural networks. For example, the first feed-forward neural network 610 included in the adapter module 635 may reduce the dimension of input data. As another example, the second feed-forward neural network 630 may increase the dimension of input data.

According to an embodiment, the activation function 620 may include a rectified linear unit (ReLu). The activation function 620 may process an input received from the first feed-forward layer 610 and may transmit the processed data to the second feed-forward layer 630.

According to an embodiment, a processor (e.g., the processor 160 in FIG. 1) may skip-connect an input terminal and output terminal of the adapter module 635, and may sum the output data of the adapter module 635 and the skip-connected data to output the summed result together.

According to an embodiment, as the adapter module 635 is added to a language model (e.g., the language model 501 in FIG. 5), the word error rate (WER) of a speech recognition module included in an electronic device may be reduced.

Figure 7:
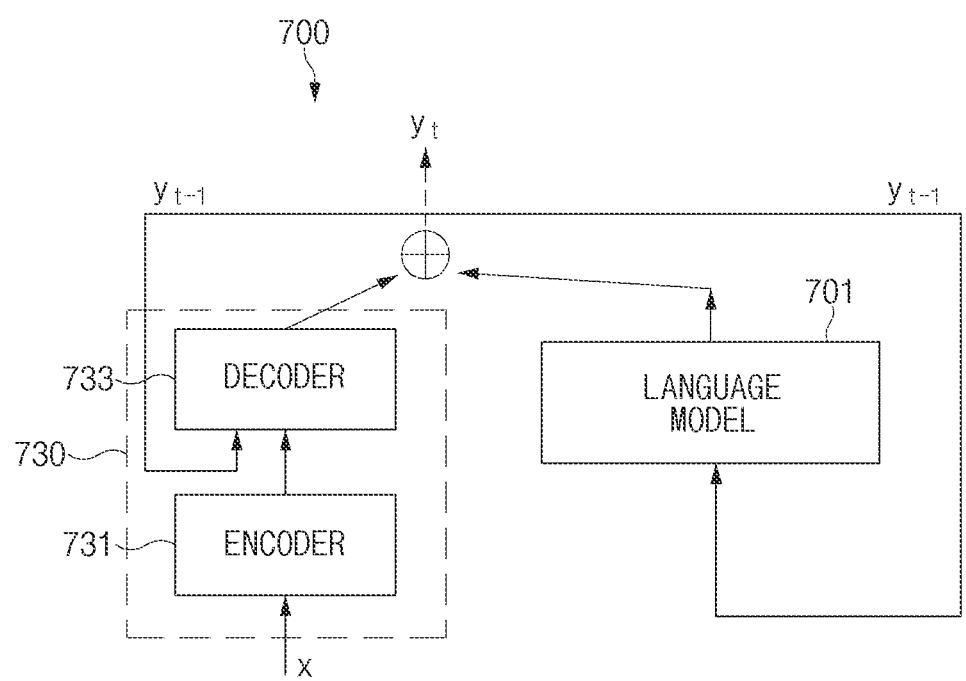
FIG. 7 is a block diagram illustrating an example speech recognition module including an ASR model and a language model, according to various embodiments.

FIG. 7 is a block diagram 700 illustrating an example speech recognition module including an ASR model 730 and a language model 701, according to various embodiments.

According to an embodiment, the ASR model 730 (e.g., the ASR model 430 of FIG. 4) may include an encoder 731 (e.g., the encoder 431 of FIG. 4) and a decoder 733 (e.g., the decoder 433 of FIG. 4). The description of the ASR model 730 of FIG. 7 may be replaced with the description of the ASR model 430 of FIG. 4.

According to an embodiment, the language model 701 (e.g., the language model 501 of FIG. 5) may receive at least part of result data generated by the speech recognition module as input data. For example, the language model 701 may receive at least part ($y_{t-1}$) of result data generated using the ASR model 730 and the language model 701 as input data, and may perform training based on the input data. For example, the language model 701 may calculate temporary output data ($y_t$) by propagating specified input data from an input embedding layer (e.g., the input embedding layer 510 of FIG. 5) to an output layer (e.g., the softmax layer 550 of FIG. 5). A processor (e.g., the processor 160 of FIG. 1) may train and/or update the language model 701 based on the temporary output data.

Figure 8:
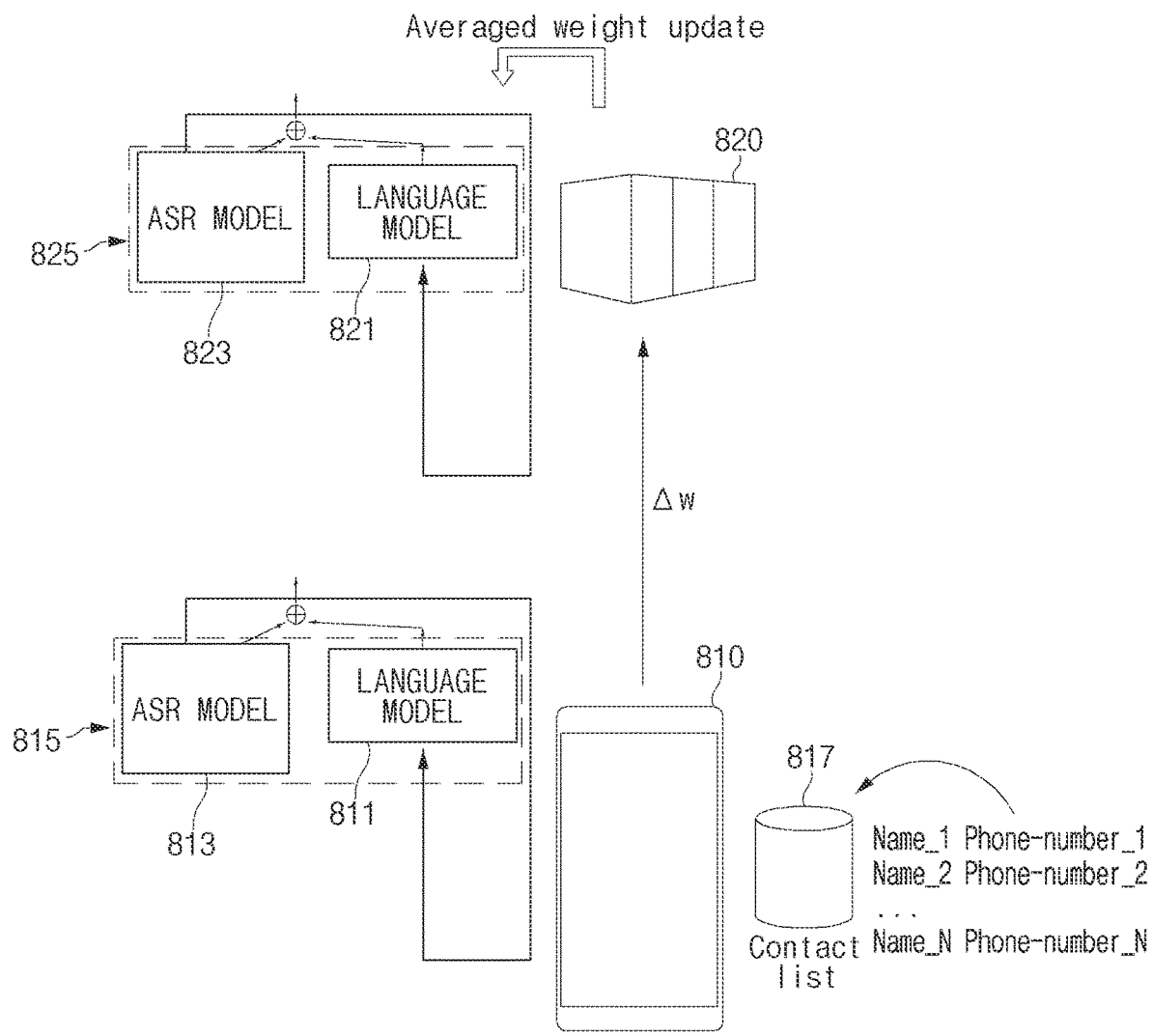
FIG. 8 is a diagram illustrating an example electronic device and a server, each of which includes a language model, according to various embodiments.

FIG. 8 is a diagram illustrating an electronic device 810 and a server 820, each of which includes a language model, according to various embodiments.

Referring to FIG. 8, according to an embodiment, each of the electronic device 810 (e.g., the user terminal 100 of FIG. 1) and the server 820 (e.g., the intelligence server 200 of FIG. 1) may include a speech recognition module (e.g., a first speech recognition module 815 and a second speech recognition module 825). For example, the first speech recognition module 815 included in the electronic device 810 may include a first language model 811 and a first ASR model 813, which are respectively independent of a second language model 821 and a second ASR model 823 of the second speech recognition module 825 included in the server 820.

According to an embodiment, the electronic device 810 may store data input from the outside (e.g., a user). For example, the user may enter input data 817 into the electronic device 810. The electronic device 810 may store the input data 817 in a memory (e.g., the memory 150 in FIG. 1). For example, referring to FIG. 8, the input data 817 may include a contact list including N pieces of contact information (e.g., 'N' is an integer that is not less than 0). The electronic device 810 may calculate an increment Δw of a weight by entering the input data 817 into the language model 811. The electronic device 810 may determine a domain associated with the input data 817, and may calculate the increment Δw of a weight using a layer, which corresponds to the determined domain, from among layers of the language model 811. For example, when the input data 817 is data (e.g., Name_1 Phone-number_1, Name_2 Phone-number_2, . . . , Name_N Phone-number_N) associated with a contact, the electronic device 810 may calculate the increment Δw of a weight using a layer of the language model 811 corresponding to a domain associated with a contact. The electronic device 810 may transmit the calculated increment Δw to the server 820 through a communication interface (e.g., the communication interface 110 of FIG. 1).

According to an embodiment, the server 820 may train the second language model 821 using the increment Δw received from the electronic device 810. According to an embodiment, the server 820 may determine a layer, which corresponds to a domain determined by the electronic device 810, from among layers of the second language model 821 and may train the determined layer using the increment Δw of a weight received from the electronic device 810.

FIG. 8 illustrates and describes an operation between the single electronic device 810 and the single server 820, but embodiments of the disclosure are not limited thereto. For example, the server 820 may train a layer corresponding to the determined domain using a value obtained by averaging increments Δw of weights received from a plurality of electronic devices.

Figure 9:
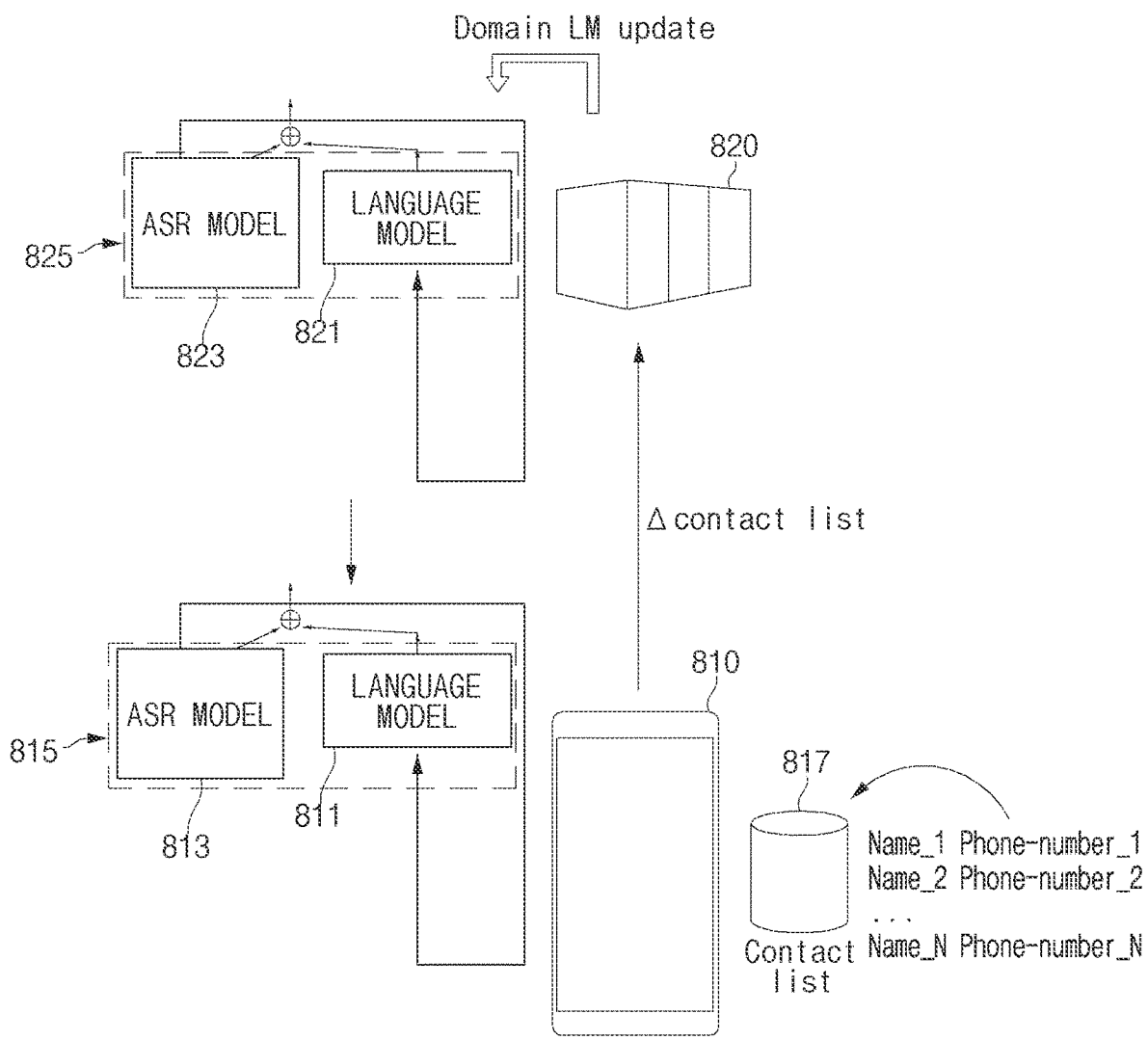
FIG. 9 is a diagram illustrating the electronic device and the server, each of which includes a language model, according to various embodiments.

FIG. 9 is a diagram illustrating the electronic device 810 and the server 820, each of which includes a language model, according to various embodiments.

The description of components (e.g., the electronic device 810, the server 820, the first speech recognition module 815, the first language model 811, the first ASR model 813, the second speech recognition module 825, the second language model 821, and the second ASR model 823), which have the same reference numerals as those of FIG. 8, from among the components shown in FIG. 9 may be referenced by the description of FIG. 8.

According to an embodiment, the electronic device 810 may store data input from the outside (e.g., a user). For example, the user may enter input data 817 into the electronic device 810. The electronic device 810 may store the input data 817 in a memory (e.g., the memory 150 in FIG. 1).

According to an embodiment, the electronic device 810 may extract only a part of data stored in the memory and may transmit the extracted part to the server 820 through a communication interface (e.g., the communication interface 110 of FIG. 1). For example, when the electronic device 810 additionally receives data associated with a contact from a user, the electronic device 810 may extract data (Δcontact list) associated with the additionally-received contact and may transmit the data (Δcontact list) to the server 820. The server 820 may determine a domain corresponding to data received from the electronic device 810. For example, the server 820 may determine that a contact domain is a domain corresponding to the received data (Δcontact list). The server 820 may determine a domain and may finely tune a layer, which corresponds to the domain determined using the received data (Δcontact list), in the second language model 821. For example, the server 820 may update a weight included in the layer corresponding to the determined domain. The server 820 may periodically transmit the finely-tuned second language model 821 to the electronic device 810. The finely-tuned second language model 821 may be periodically synchronized with the first language model 811 included in the electronic device 810. As another example, the server 820 may transmit the finely-tuned second language model 821 to the electronic device 810 based on an update request of the electronic device 810. When the finely-tuned second language model 821 is updated based on data (Δcontact list) received from the electronic device 810, the second language model 821 may be synchronized with the first language model 811 included in the electronic device 810.

Figure 10:
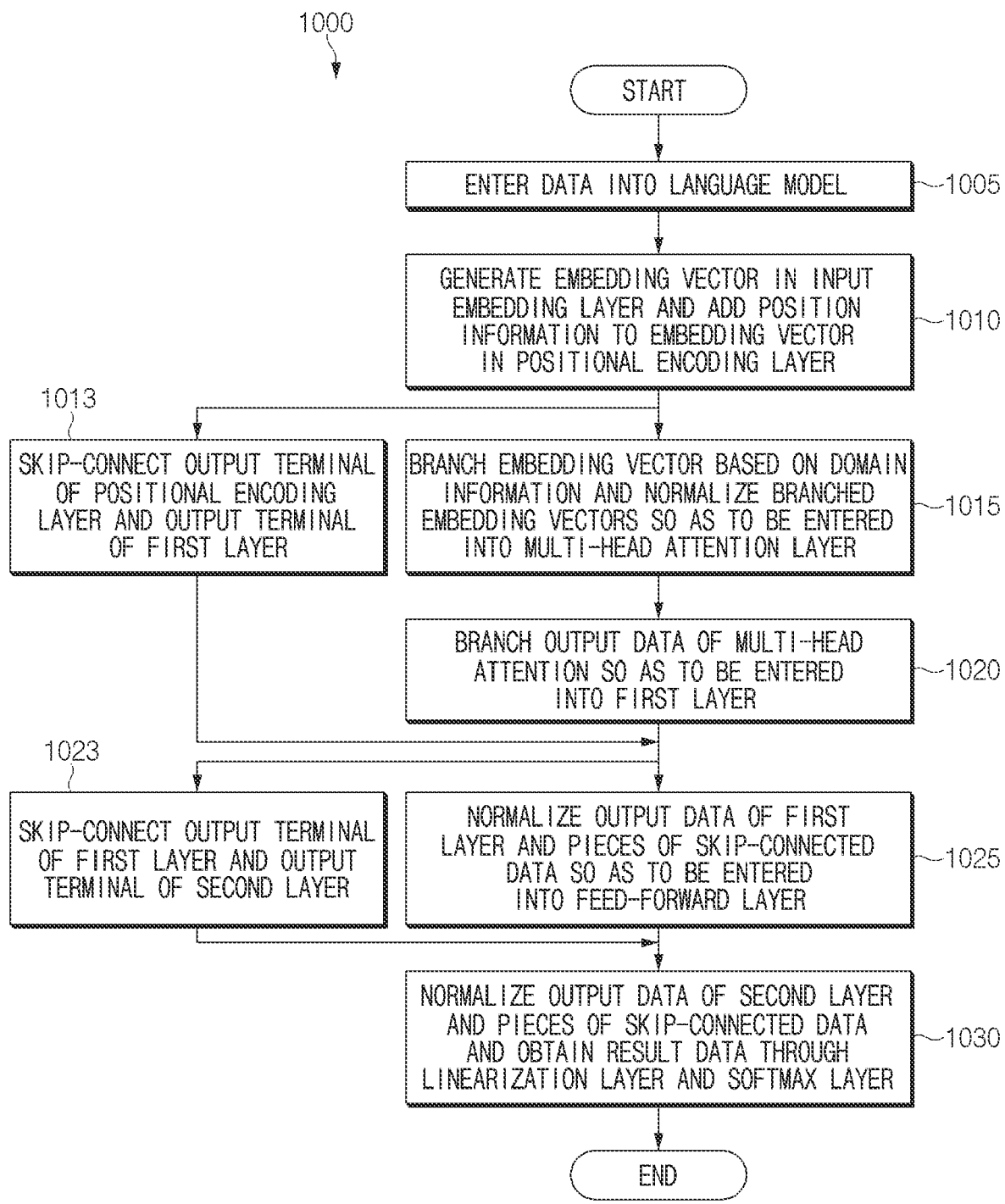
FIG. 10 is a flowchart illustrating example operation of a language model, according to various embodiments.

FIG. 10 is a flowchart 1000 illustrating an example operation of a language model, according to various embodiments.

An architecture of a language model described in FIG. 10 may be substantially the same as or similar to the architecture of the language model 501 of FIG. 5.

According to an embodiment, operations (operation 1005 to operation 1030) of a language model described in FIG. 10 may be performed by a processor (e.g., the processor 160 in FIG. 1) of an electronic device (e.g., the user terminal 100 or the intelligence server 200 in FIG. 1).

According to an embodiment, in operation 1005, the processor (e.g., the processor 160 of FIG. 1) may enter data into a language model (e.g., the language model 501 of FIG. 5). For example, data entered into the language model may be at least part of result data generated using the ASR model (e.g., the ASR model 730 of FIG. 7) and the language model. The language model may perform training using the entered data.

In operation 1010, the language model may generate an embedding vector based on data entered through the input embedding layer (e.g., the input embedding layer 510 of FIG. 5) and may add position information to the embedding vector using a positional encoding layer (e.g., the positional encoding layer 520 of FIG. 5).

In operation 1013, the language model may include an architecture in which the output terminal of the positional encoding layer and the output terminal of the first layer (e.g., the first layer 535a of FIG. 5) are skip-connected. For example, output data of the positional encoding layer and output data of the first layer may be summed in the output terminal of the first layer.

In operation 1015, the language model may branch the embedding vector based on domain information and may normalize the branched embedding vectors so as to be entered into a multi-head attention layer (e.g., the multi-head attention layer 531 of FIG. 5). For example, the multi-head attention layer may be referred to as an architecture including a function having a plurality of attention mechanisms. For example, the language model may branch and normalize the embedding vector to be entered into the multi-head attention layer, and then may generate a parameter corresponding to at least one of a query, a key, or a value to enter the parameter to the multi-head attention layer.

In operation 1020, the language model may branch output data of the multi-head attention so as to be entered into the first layer. For example, the first layer may include a plurality of first adapter modules. Output data of the multi-head attention layer may be branched to at least one of the plurality of first adapter modules. Pieces of data branched in the multi-head attention layer may be classified and normalized, and pieces of normalized data may be entered into the next layer.

In operation 1023, the language model may include an architecture in which the output terminal of the first layer and an output terminal of the second layer are skip-connected. For example, the output data of the first layer and output data of the second layer may be summed in the output terminal of the second layer.

In operation 1025, the language model may normalize the output data of the first layer and pieces of skip-connected data (e.g., output data of a positional encoding layer) so as to be entered into a feed-forward layer (e.g., the feed-forward layer 533 of FIG. 5). The feed-forward layer may include a position-wise fully-connected feed-forward neural network (FFNN).

In operation 1030, the language model may normalize the output data of the second layer and pieces of skip-connected data (e.g., output data of the first layer) and may obtain result data through a linearization layer (e.g., the linearization layer 540 of FIG. 5) and a softmax layer (e.g., the softmax layer 550 of FIG. 5).

Figure 11:
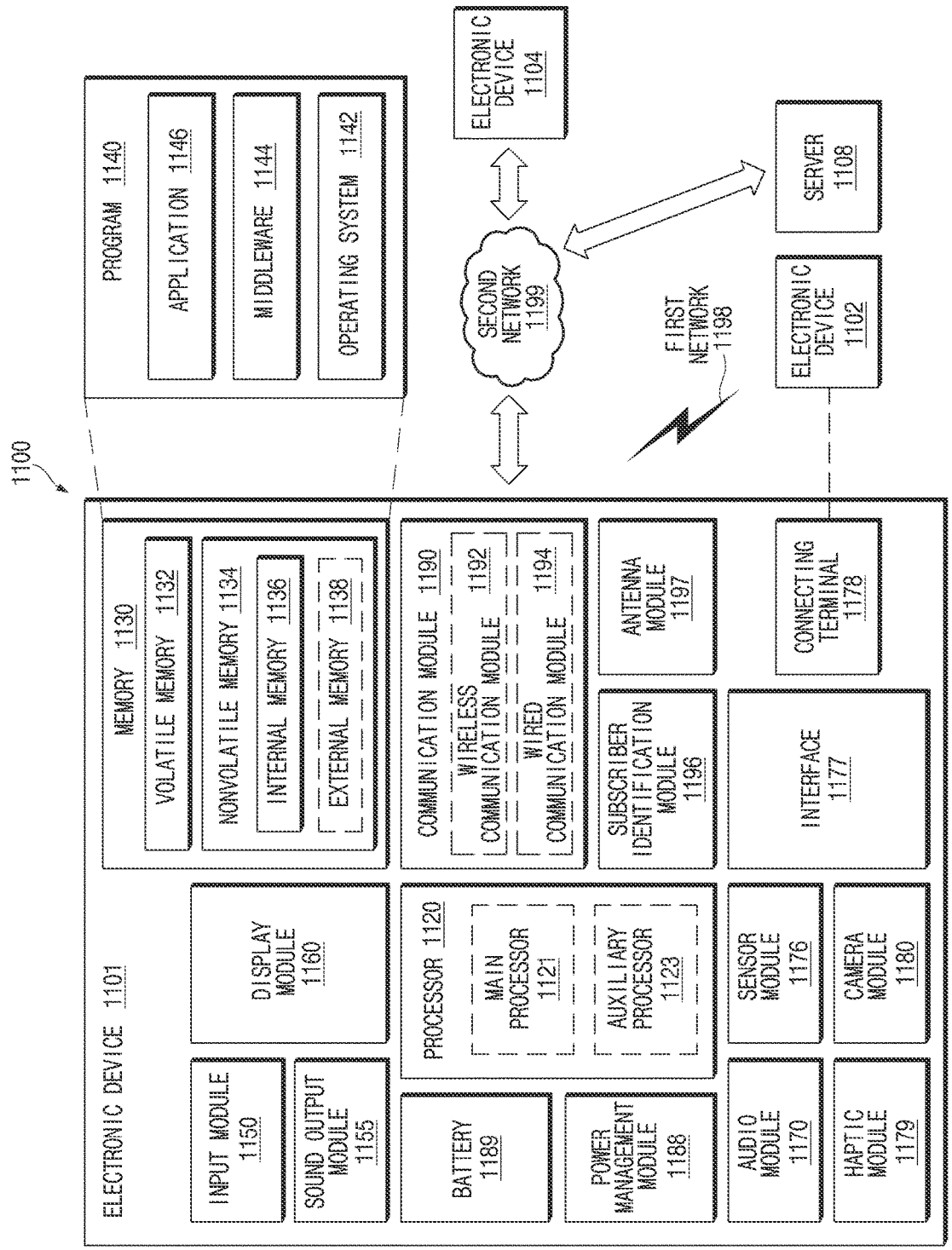
FIG. 11 is a block diagram illustrating an electronic device in a network environment, according to various embodiments.

FIG. 11 is a block diagram illustrating an example electronic device 1101 in a network environment 1100 according to various embodiments. Referring to FIG. 11, the electronic device 1101 in the network environment 1100 may communicate with an electronic device 1102 via a first network 1198 (e.g., a short-range wireless communication network), or an electronic device 1104 or a server 1108 via a second network 1199 (e.g., a long-range wireless communication network). According to an embodiment, the electronic device 1101 may communicate with the electronic device 1104 via the server 1108. According to an embodiment, the electronic device 1101 may include a processor 1120, a memory 1130, an input module 1150, a sound output module 1155, a display module 1160, an audio module 1170, a sensor module 1176, an interface 1177, a connecting terminal 1178, a haptic module 1179, a camera module 1180, a power management module 1188, a battery 1189, a communication module 1190, a subscriber identification module (SIM) 1196, or an antenna module 1197. In some embodiments, at least one (e.g., the connecting terminal 1178) of the components may be omitted from the electronic device 1101, or one or more other components may be added in the electronic device 1101. In an embodiment, some (e.g., the sensor module 1176, the camera module 1180, or the antenna module 1197) of the components may be implemented as single component (e.g., the display module 1160).

The processor 1120 may execute, for example, software (e.g., a program 1140) to control at least one other component (e.g., a hardware or software component) of the electronic device 1101 coupled with the processor 1120, and may perform various data processing or computation. According to an embodiment, as at least part of the data processing or computation, the processor 1120 may store a command or data received from another component (e.g., the sensor module 1176 or the communication module 1190) in a volatile memory 1132, process the command or the data stored in the volatile memory 1132, and store resulting data in a non-volatile memory 1134. According to an embodiment, the processor 1120 may include a main processor 1121 (e.g., a central processing unit (CPU) or an application processor (AP)), and an auxiliary processor 1123 (e.g., a graphics processing unit (GPU), a neural processing unit (NPU), an image signal processor (ISP), a sensor hub processor, or a communication processor (CP)) that is operable independently from, or in conjunction with, the main processor 1121. For example, when the electronic device 1101 includes the main processor 1121 and the auxiliary processor 1123, the auxiliary processor 1123 may be adapted to consume less power than the main processor 1121, or to be specific to a specified function. The auxiliary processor 1123 may be implemented as separate from, or as part of the main processor 1121.

The auxiliary processor 1123 may control at least some of functions or states related to at least one component (e.g., the display module 1160, the sensor module 1176, or the communication module 1190) among the components of the electronic device 1101, instead of the main processor 1121 while the main processor 1121 is in an inactive (e.g., sleep) state, or together with the main processor 1121 while the main processor 1121 is in an active state (e.g., executing an application). According to an embodiment, the auxiliary processor 1123 (e.g., an image signal processor or a communication processor) may be implemented as part of another component (e.g., the camera module 1180 or the communication module 1190) functionally related to the auxiliary processor 1123. According to an embodiment, the auxiliary processor 1123 (e.g., a neural network processing unit) may include a hardware structure specialized to process an artificial intelligence model. The artificial intelligence model may be generated through machine learning. For example, the learning may be performed in the electronic device 1101, in which an artificial intelligence program is performed, or may be performed through a separate server (e.g., the server 1108). For example, the learning algorithm may include supervised learning, unsupervised learning, semi-supervised learning, or reinforcement learning, but may not be limited to the above example. The artificial intelligence model may include a plurality of artificial neural network layers. The artificial neural network may be one of a deep neural network (DNN), a convolutional neural network (CNN), a recurrent neural network (RNN), a restricted Boltzmann machine (RBM), a deep belief network (DBN), a bidirectional recurrent deep neural network (BRDNN), a deep Q-network, or a combination of two or more of the above-described networks, but may not be limited to the above-described example. In addition to a hardware structure, additionally or alternatively, the artificial intelligence model may include a software structure.

The memory 1130 may store various data used by at least one component (e.g., the processor 1120 or the sensor module 1176) of the electronic device 1101. The various data may include, for example, software (e.g., the program 1140) and input data or output data for a command related thereto. The memory 1130 may include the volatile memory 1132 or the non-volatile memory 1134.

The program 1140 may be stored in the memory 1130 as software, and may include, for example, an operating system (OS) 1142, middleware 1144, or an application 1146.

The input module 1150 may receive a command or data to be used by other component (e.g., the processor 1120) of the electronic device 1101, from the outside (e.g., a user) of the electronic device 1101. The input module 1150 may include, for example, a microphone, a mouse, a keyboard, a key (e.g., a button), or a digital pen (e.g., a stylus pen).

The sound output module 1155 may output sound signals to the outside of the electronic device 1101. The sound output module 1155 may include, for example, a speaker or a receiver. The speaker may be used for general purposes, such as playing multimedia or playing record. The receiver may be used for an incoming call. According to an embodiment, the receiver may be implemented as separate from, or as part of the speaker.

The display module 1160 may visually provide information to the outside (e.g., a user) of the electronic device 1101. The display module 1160 may include, for example, a display, a hologram device, or a projector and control circuitry to control a corresponding one of the display, hologram device, and projector. According to an embodiment, the display module 1160 may include a touch sensor adapted to detect a touch, or a sensor (e.g., a pressure sensor) adapted to measure the intensity of force incurred by the touch.

The audio module 1170 may convert a sound into an electrical signal and vice versa. According to an embodiment, the audio module 1170 may obtain the sound via the input module 1150, or output the sound via the sound output module 1155 or an external electronic device (e.g., the electronic device 1102) (e.g., speaker of headphone) directly (e.g., wiredly) or wirelessly coupled with the electronic device 1101.

The sensor module 1176 may detect an operational state (e.g., power or temperature) of the electronic device 1101 or an environmental state (e.g., a state of a user) external to the electronic device 1101, and then generate an electrical signal or data value corresponding to the detected state. According to an embodiment, the sensor module 1176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1177 may support one or more specified protocols to be used for the electronic device 1101 to be coupled with the external electronic device (e.g., the electronic device 1102) directly (e.g., wiredly) or wirelessly. According to an embodiment, the interface 1177 may include, for example, a high definition multimedia interface (HDMI), a universal serial bus (USB) interface, a secure digital (SD) card interface, or an audio interface.

The connecting terminal 1178 may include a connector via which the electronic device 1101 may be physically connected with the external electronic device (e.g., the electronic device 1102). According to an embodiment, the connecting terminal 1178 may include, for example, a HDMI connector, a USB connector, a SD card connector, or an audio connector (e.g., a headphone connector).

The haptic module 1179 may convert an electrical signal into a mechanical stimulus (e.g., a vibration or a movement) or electrical stimulus which may be recognized by a user via his tactile sensation or kinesthetic sensation. According to an embodiment, the haptic module 1179 may include, for example, a motor, a piezoelectric element, or an electric stimulator.

The camera module 1180 may capture a still image or moving images. According to an embodiment, the camera module 1180 may include one or more lenses, image sensors, image signal processors, or flashes.

The power management module 1188 may manage power supplied to the electronic device 1101. According to an embodiment, the power management module 1188 may be implemented as at least part of, for example, a power management integrated circuit (PMIC).

The battery 1189 may supply power to at least one component of the electronic device 1101. According to an embodiment, the battery 1189 may include, for example, a primary cell which is not rechargeable, a secondary cell which is rechargeable, or a fuel cell.

The communication module 1190 may support establishing a direct (e.g., wired) communication channel or a wireless communication channel between the electronic device 1101 and the external electronic device (e.g., the electronic device 1102, the electronic device 1104, or the server 1108) and performing communication via the established communication channel. The communication module 1190 may include one or more communication processors that are operable independently from the processor 1120 (e.g., the application processor (AP)) and supports a direct (e.g., wired) communication or a wireless communication. According to an embodiment, the communication module 1190 may include a wireless communication module 1192 (e.g., a cellular communication module, a short-range wireless communication module, or a global navigation satellite system (GNSS) communication module) or a wired communication module 1194 (e.g., a local area network (LAN) communication module or a power line communication (PLC) module). A corresponding one of these communication modules may communicate with the external electronic device 1104 via the first network 1198 (e.g., a short-range communication network, such as Bluetooth™, wireless-fidelity (Wi-Fi) direct, or infrared data association (IrDA)) or the second network 1199 (e.g., a long-range communication network, such as a legacy cellular network, a 5G network, a next generation communication network, the Internet, or a computer network (e.g., LAN or wide area network (WAN))). These various types of communication modules may be implemented as a single component (e.g., a single chip), or may be implemented as multi components (e.g., multi chips) separate from each other. The wireless communication module 1192 may identify or authenticate the electronic device 1101 in a communication network, such as the first network 1198 or the second network 1199, using subscriber information (e.g., international mobile subscriber identity (IMSI)) stored in the subscriber identification module 1196.

The wireless communication module 1192 may support a 5G network and a next-generation communication technology after a 4G network, for example, a new radio (NR) access technology. The NR access technology may support high-speed transmission of high-capacity data (enhanced mobile broadband (eMBB)), terminal power minimization and connection of multiple terminals (massive machine type communications (mMTC)), or ultra-reliable and low-latency communications (URLLC). For example, the wireless communication module 1192 may support a high frequency band (e.g., mmWave band) to achieve a high data transfer rate. The wireless communication module 1192 may support various technologies for securing performance in a high frequency band, for example, technologies such as beam-forming, massive multiple-input and multiple-output (massive MIMO), full dimensional MIMO (FD-MIMO), an array antenna, analog beam-forming, and a large scale antenna. The wireless communication module 1192 may support various requirements regulated in the electronic device 1101, an external electronic device (e.g., the electronic device 1104) or a network system (e.g., the second network 1199). According to an embodiment, the wireless communication module 1192 may support peak data rate (e.g., 20 Gbps or more) for eMBB implementation, loss coverage (e.g., 164 dB or less) for mMTC implementation, or U-plane latency (e.g., downlink (DL) of 0.5 ms or less and uplink (UL) of 0.5 ms or less, or round trip of 1 ms or less) for URLLC implementation.

The antenna module 1197 may transmit or receive a signal or power to or from the outside (e.g., the external electronic device) of the electronic device 1101. According to an embodiment, the antenna module 1197 may include an antenna including a radiating element including a conductive material or a conductive pattern formed in or on a substrate (e.g., PCB). According to an embodiment, the antenna module 1197 may include a plurality of antennas (e.g., an antenna array). In such a case, at least one antenna appropriate for a communication scheme used in the communication network, such as the first network 1198 or the second network 1199, may be selected, for example, by the communication module 1190 from the plurality of antennas. The signal or the power may then be transmitted or received between the communication module 1190 and the external electronic device via the selected at least one antenna. According to an embodiment, another component (e.g., a radio frequency integrated circuit (RFIC)) other than the radiating element may be additionally formed as part of the antenna module 1197.

According to various embodiments, the antenna module 1197 may form an mmWave antenna module. According to an embodiment, the mmWave antenna module may include a printed circuit board (PCB), a radio frequency integrated circuit (RFIC), and a plurality of antennas (e.g., an array antenna). The RFIC may be disposed on or adjacent to a first surface (e.g., a bottom surface) of the PCB and may support a specified high frequency band (e.g., mmWave band). The plurality of antennas may be disposed on or adjacent to a second surface (e.g., a top surface or a side surface) of the PCB and may transmit or receive a signal in the specified high frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1101 and the external electronic device 1104 via the server 1108 coupled with the second network 1199. Each of the external electronic devices 1102 and 1104 may be a device of a same type as, or a different type, from the electronic device 1101. According to an embodiment, all or some of operations to be executed at the electronic device 1101 may be executed at one or more of the external electronic devices 1102, 1104, or 1108. For example, when the electronic device 1101 should perform a function or a service automatically, or in response to a request from a user or another device, the electronic device 1101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1101. The electronic device 1101 may provide the outcome, with or without further processing of the outcome, as at least part of a reply to the request. To that end, a cloud computing, distributed computing, mobile edge computing (MEC), or client-server computing technology may be used, for example. For example, the electronic device 1101 may provide an ultra-low latency service using distributed computing or mobile edge computing. In another embodiment, the external electronic device 1104 may include an Internet of Things (IoT) device. The server 1108 may be an intelligent server using machine learning and/or a neural network. According to an embodiment, the external electronic device 1104 or the server 1108 may be included in the second network 1199. The electronic device 1101 may be applied to an intelligence service (e.g., a smart home, a smart city, a smart car, or a healthcare) based on 5G communication technology and IoT-related technology.

According to various embodiments of the disclosure, an electronic device may include a processor and a memory operatively connected to the processor and storing at least one language model. The language model may include an input embedding layer, a positional encoding layer, at least one sub-network layer, a linearization layer, and a softmax layer. The at least one sub-network layer may include a multi-head attention layer, a first layer, a feed-forward layer, and a second layer.

According to an example embodiment, the memory may store one or more instructions that, when executed, cause the processor to: enter data into the language model, generate an embedding vector based on the data in the input embedding layer, add position information to the embedding vector in the positional encoding layer, branch the embedding vector based on domain information included in the embedding vector, normalize the branched embedding vectors, enter the normalized embedding vectors into the multi-head attention layer, enter output data of the multi-head attention layer into the first layer, normalize pieces of output data of the first layer, enter the normalized pieces of output data of the first layer into the feed-forward layer, enter output data of the feed-forward layer into the second layer and to normalize pieces of output data of the second layer, and enter the normalized pieces of output data of the second layer into the linearization layer and the softmax layer to obtain result data.

According to an example embodiment, the first layer may include a plurality of first adapter modules. The one or more instructions may, when executed, cause the processor to: branch the output data of the multi-head attention layer to be entered into at least one of the plurality of first adapter modules and normalize the branched pieces of data to be entered into the feed-forward layer.

According to an example embodiment, the second layer may include a plurality of second adapter modules. The one or more instructions may, when executed, cause the processor to: branch the output data of the feed-forward layer to be entered into at least one of the plurality of second adapter modules and normalize the branched pieces of data to be entered into the linearization layer.

According to an example embodiment, the plurality of first adapter modules may respectively correspond to different domains, and the plurality of second adapter modules may respectively correspond to different domains, and each of the plurality of first adapter modules or each of the plurality of second adapter modules may include at least one feed-forward neural network and an activation function.

According to an example embodiment, the activation function may include a rectified linear unit (ReLu).

According to an example embodiment, the one or more instructions may, when executed, cause the processor to: change a dimension of data entered into at least one of the plurality of first adapter modules and the plurality of second adapter modules using the at least one feed-forward neural network.

According to an example embodiment, the one or more instructions may, when executed, cause the processor to: skip-connect an output terminal of the positional encoding layer and an output terminal of the first layer and sum and normalize the skip-connected pieces of data and skip-connect the output terminal of the first layer and an output terminal of the second layer and sum and normalize the skip-connected pieces of data.

According to an example embodiment, the one or more instructions may, when executed, cause the processor to: branch the embedding vector, normalize the branched embedding vectors, generate at least one of a query, a key, or a value based on the normalized embedding vectors, and enter the generated at least one of a query, a key, or a value into the multi-head attention layer.

According to an example embodiment, the electronic device may further include an auto speech recognition (ASR) model. The one or more instructions may, when executed, cause the processor to: enter at least part of result data generated using the ASR model and the language model, as input data of the language model. The language model may perform training using the input data.

According to an example embodiment, the one or more instructions may, when executed, cause the processor to: control the electronic device to transmit input data of an ASR model and the language model or an increment of a weight generated based on the input data, to an outside.

According to various example embodiments of the present disclosure, a method of controlling an ASR model and a language model by an electronic device may include: entering data into the language model and generating an embedding vector based on the data in an input embedding layer, adding position information to the embedding vector in a positional encoding layer, branching the embedding vector based on domain information included in the embedding vector, normalizing the branched embedding vectors, entering the normalized embedding vectors into a multi-head attention layer, entering output data of the multi-head attention layer into a first layer and normalizing pieces of output data of the first layer, entering the normalized pieces of output data of the first layer into a feed-forward layer, entering output data of the feed-forward layer into a second layer and normalizing pieces of output data of the second layer, and entering the normalized pieces of output data of the second layer into a linearization layer and a softmax layer to obtain result data.

According to an example embodiment, the first layer may include a plurality of first adapter modules. The entering of the output data of the multi-head attention layer into the first layer and the normalizing of the pieces of output data of the first layer may include: branching the output data of the multi-head attention layer to be entered into at least one of the plurality of first adapter modules, and normalizing the branched pieces of data to be entered into the feed-forward layer.

According to an example embodiment, the second layer may include a plurality of second adapter modules. The entering of the output data of the feed-forward layer into the second layer and the normalizing of the pieces of output data of the second layer may include: branching the output data of the feed-forward layer to be entered into at least one of the plurality of second adapter modules, and normalizing the branched pieces of data to be entered into the linearization layer.

According to an example embodiment, the method of controlling the ASR model and the language model by the electronic device may further include: changing a dimension of data entered into at least one of the plurality of first adapter modules and the plurality of second adapter modules using the at least one feed-forward neural network.

According to an example embodiment, the method of controlling the ASR model and the language model by the electronic device may further include: skip-connecting an output terminal of the positional encoding layer and an output terminal of the first layer and summing and normalizing the skip-connected pieces of data, and skip-connecting the output terminal of the first layer and an output terminal of the second layer and summing and normalizing the skip-connected pieces of data.

According to an example embodiment, the branching of the embedding vector, the normalizing of the branched embedding vectors, and the entering of the normalized embedding vectors into the multi-head attention layer may include: branching the embedding vector, normalizing the branched embedding vectors, generating at least one of a query, a key, or a value based on the normalized embedding vectors, and entering the generated at least one of a query, a key, or a value into the multi-head attention layer.

According to an example embodiment, the method of controlling the ASR model and the language model by the electronic device may further include: entering at least part of result data generated using the ASR model and the language model as input data of the language model and performing training of the language model using the input data.

According to an example embodiment, the method of controlling the ASR model and the language model by the electronic device may further include: transmitting input data of the ASR model and the language model or a weight generated based on the input data, to an outside.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The invention claimed is:

1. An electronic device comprising:
   at least one processor; and
   a memory operatively connected to the at least one processor and configured to store at least one language model,
   wherein the language model includes an input embedding layer, a positional encoding layer, at least one sub-network layer, a linearization layer, and a softmax layer,
   wherein the at least one sub-network layer includes a linear normalization layer, a multi-head attention layer, a first layer including a plurality of first adapter modules respectively corresponding to different domains included in the at least one language model, a feed-forward layer, and a second layer including a plurality of second adapter modules respectively corresponding to the different domains in the at least one language model, wherein the different domains correspond to different contacts on a contact list or correspond to different applications,
   wherein the at least one processor is configured to:
   enter data into the language model, generate an embedding vector based on the data in the input embedding layer, and add position information to the embedding vector in the positional encoding layer;
   branch the embedding vector based on domain information included in the embedding vector, normalize the branched embedding vectors using the linear normalization layer, and enter the normalized embedding vectors into the multi-head attention layer;
   branch output data of the multi-head attention layer into one or more of the plurality of first adapter modules of the first layer corresponding to the domain information included is the embedding vector, normalize pieces of output data of the first layer, and enter the normalized pieces of output data of the first layer into the feed-forward layer;
   branch output data of the feed-forward layer into one or more of the plurality of second adapter modules of the second layer corresponding to the domain information included in the embedding vector and normalize pieces of output data of the second layer; and
   enter the normalized pieces of output data of the second layer into the linearization layer and the softmax layer to obtain result data.

2. The electronic device of claim 1,
   wherein the at least one processor is configured to:
   normalize the branched pieces of data to be entered into the feed-forward layer.

3. The electronic device of claim 2,
   wherein the at least one processor is configured to:
   normalize the branched pieces of data to be entered into the linearization layer.

4. The electronic device of claim 1,
   wherein each of the plurality of first adapter modules or each of the plurality of second adapter modules includes at least one feed-forward neural network and an activation function.

5. The electronic device of claim 4, wherein the activation function includes a rectified linear unit (ReLu).

6. The electronic device of claim 4, wherein the at least one processor is configured to:
   change a dimension of data entered into at least one of the plurality of first adapter modules and the plurality of second adapter modules using the at least one feed-forward neural network.

7. The electronic device of claim 1, wherein the at least one processor is configured to:
   skip-connect an output terminal of the positional encoding layer and an output terminal of the first layer and sum and normalize the skip-connected pieces of data; and
   skip-connect the output terminal of the first layer and an output terminal of the second layer and sum and normalize the skip-connected pieces of data.

8. The electronic device of claim 1, wherein the at least one processor is configured to:
   branch the embedding vector;
   normalize the branched embedding vector;
   generate at least one of a query, a key, or a value based on the normalized embedding vectors; and
   enter the generated at least one of a query, a key, or a value into the multi-head attention layer.

9. The electronic device of claim 1, further comprising:
   an automatic speech recognition (ASR) model,
   wherein the at least one processor is configured to:
   enter at least part of result data generated using the ASR model and the language model as input data of the language model, and
   wherein the language model is configured to perform training using the input data.

10. The electronic device of claim 1, wherein the at least one processor is configured to control the electronic device to:
    transmit input data of an ASR model and the language model or an increment of a weight generated based on the input data, to an outside.

11. A method of controlling an automatic speech recognition (ASR) model and a language model by an electronic device, the language model includes an input embedding layer, a positional encoding layer, at least one subnetwork layer, a linearization layer, and a softmax layer, wherein the at least one sub-network layer includes a linear normalization layer, a multi-head attention layer, a first layer including a plurality of first adapter modules respectively corresponding to different domains included in the language model, a feed-forward layer, and a second layer including a plurality of second adapter modules respectively corresponding to the different domains in the language model, wherein the different domains correspond to different contacts on a contact list or correspond to different applications, the method comprising:
  entering data into the language model and generating an embedding vector based on the data in the input embedding layer;
  adding position information to the embedding vector in the position encoding layer;
  branching the embedding vector based on domain information included in the embedding vector, normalizing the branched embedding vectors using the linear normalization layer, and entering the normalized embedding vectors into the multi-head attention layer;
  branching output data of the multi-head attention layer into one or more of the plurality of the first adapter modules of the first layer corresponding to the domain information included in the embedding vector and normalizing pieces of output data of the first layer;
  entering the normalized pieces of output data of the first layer into the feed-forward layer;
  branching output data of the feed-forward layer into one or more of the plurality of second adapter modules of the second layer co responding to the domain information included in the embedding vector and normalizing pieces of output data of the second layer; and
  entering the normalized pieces of output data of the second layer into a linearization layer and a softmax layer to obtain result data.

12. The method of claim 11,
  wherein the entering of the output data of the multi-head attention layer into the first layer and the normalizing of the pieces of output data of the first layer includes:
  normalizing the branched pieces of data to be entered into the feed-forward layer.

13. The method of claim 12,
  wherein the entering of the output data of the feed-forward layer into the second layer and the normalizing of the pieces of output data of the second layer includes:
  normalizing the branched pieces of data to be entered into the linearization layer.

14. The method of claim 11,
  wherein each of the plurality of first adapter modules or each of the plurality of second adapter modules includes at least one feed-forward neural network and an activation function.

15. The method of claim 14, wherein the activation function includes a rectified linear unit (ReLu).

16. The method of claim 14, further comprising:
  changing a dimension of data entered into at least one of the plurality of first adapter modules and the plurality of second adapter modules, using the at least one feed-forward neural network.

17. The method of claim 11, further comprising:
  skip-connecting an output terminal of the positional encoding layer and an output terminal of the first layer and summing and normalizing the skip-connected pieces of data; and
  skip-connecting the output terminal of the first layer and an output terminal of the second layer and summing and normalizing the skip-connected pieces of data.

18. The method of claim 11, wherein the branching of the embedding vector, the normalizing of the branched embedding vectors, and the entering of the normalized embedding vectors into the multi-head attention layer includes:
  branching the embedding vector;
  normalizing the branched embedding vectors;
  generating at least one of a query, a key, or a value based on the normalized embedding vectors; and
  entering the generated at least one of a query, a key, or a value into the multi-head attention layer.

19. The method of claim 11, further comprising:
  entering at least part of result data generated using the ASR model and the language model, as input data of the language model; and
  performing training of the language model by using the input data.

20. The method of claim 11, further comprising:
  transmitting input data of the ASR model and the language model or a weight generated based on the input data, to an outside.

* * * * *